Patented May 2, 1933

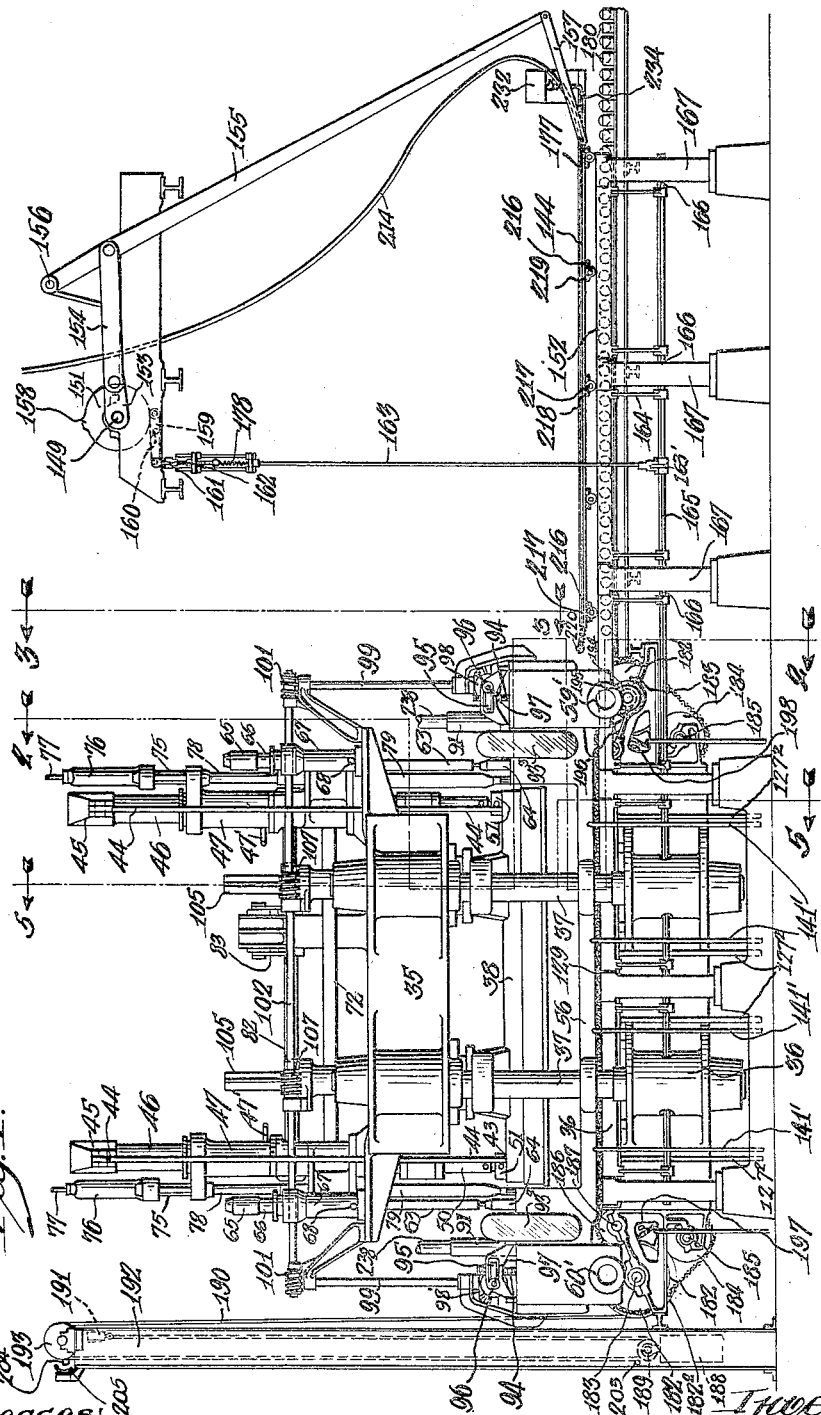

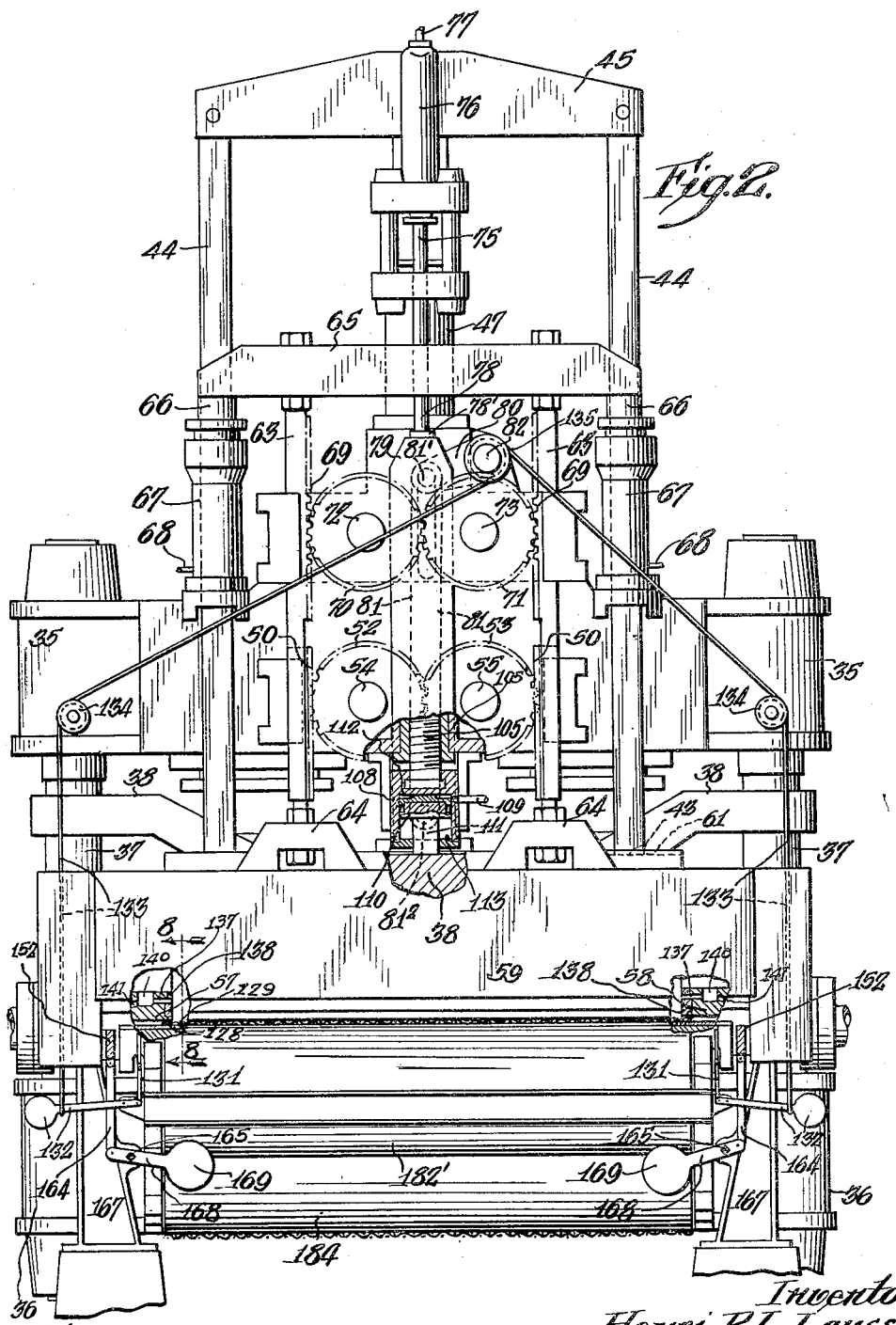

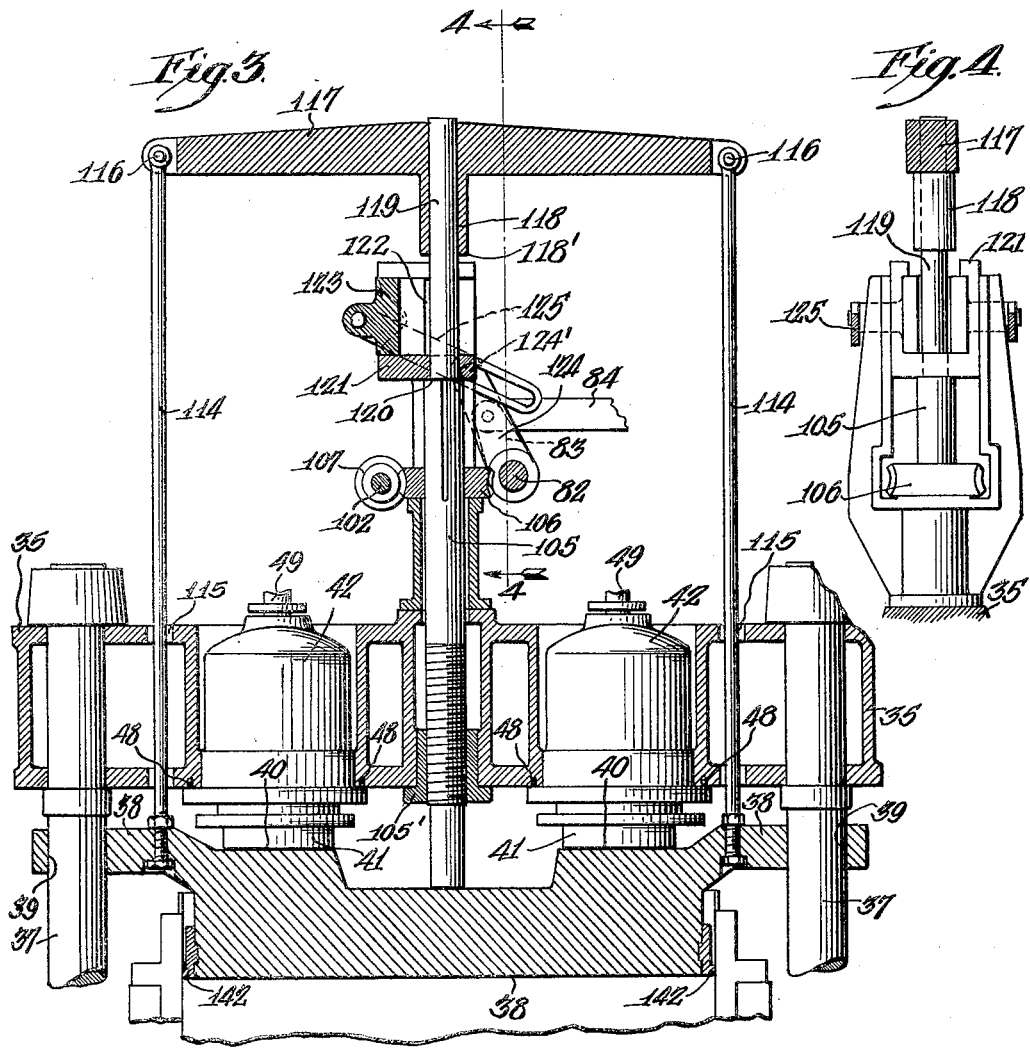

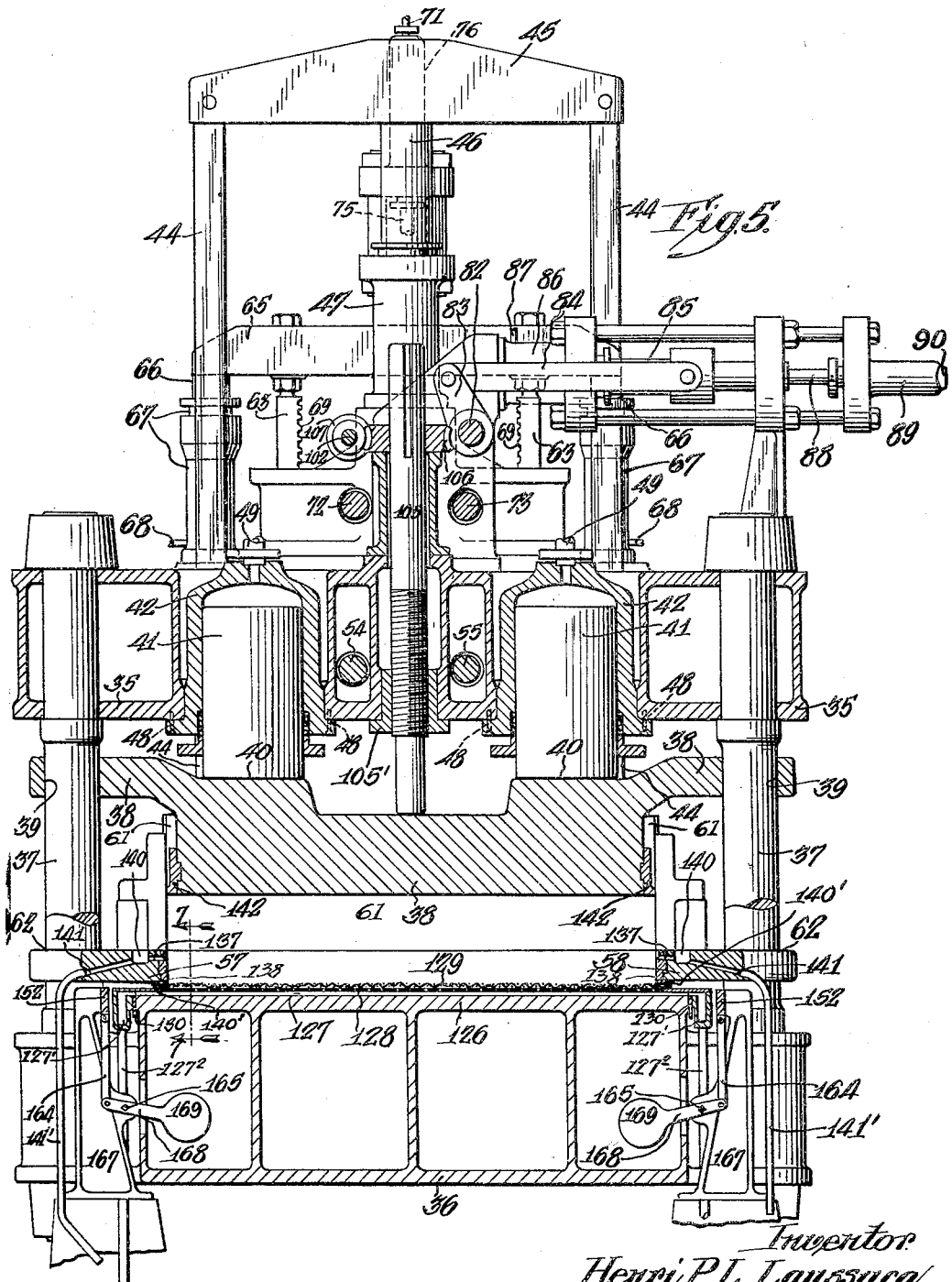

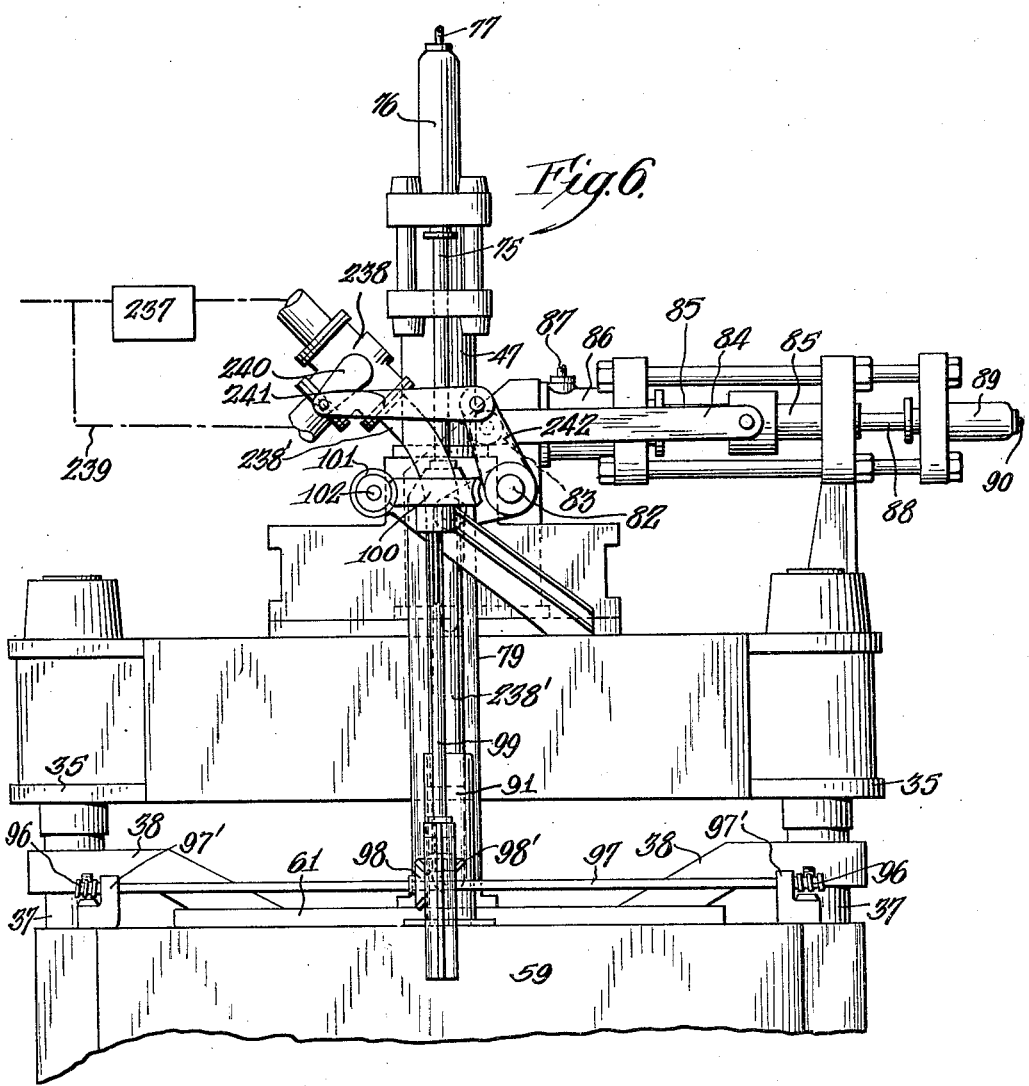

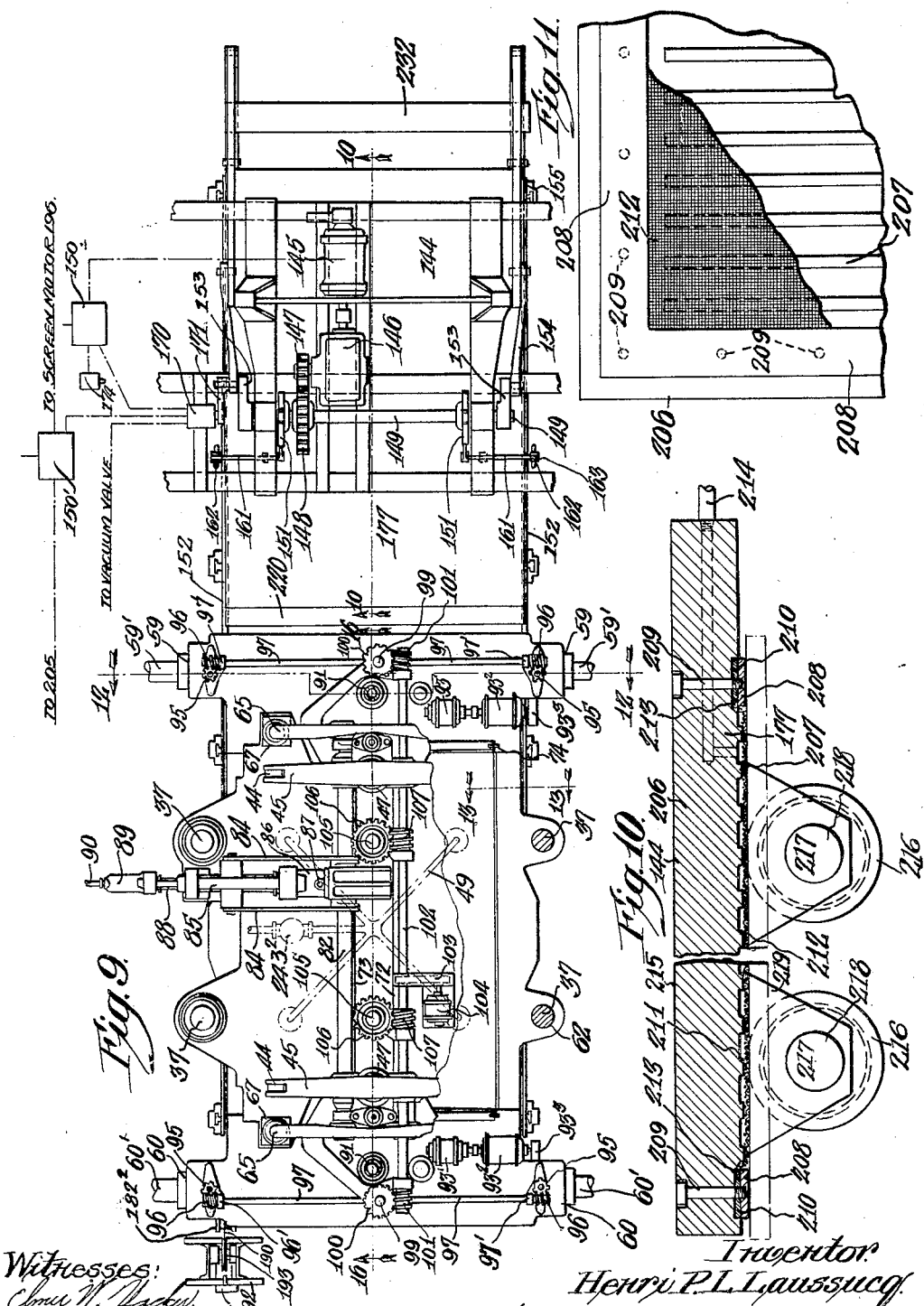

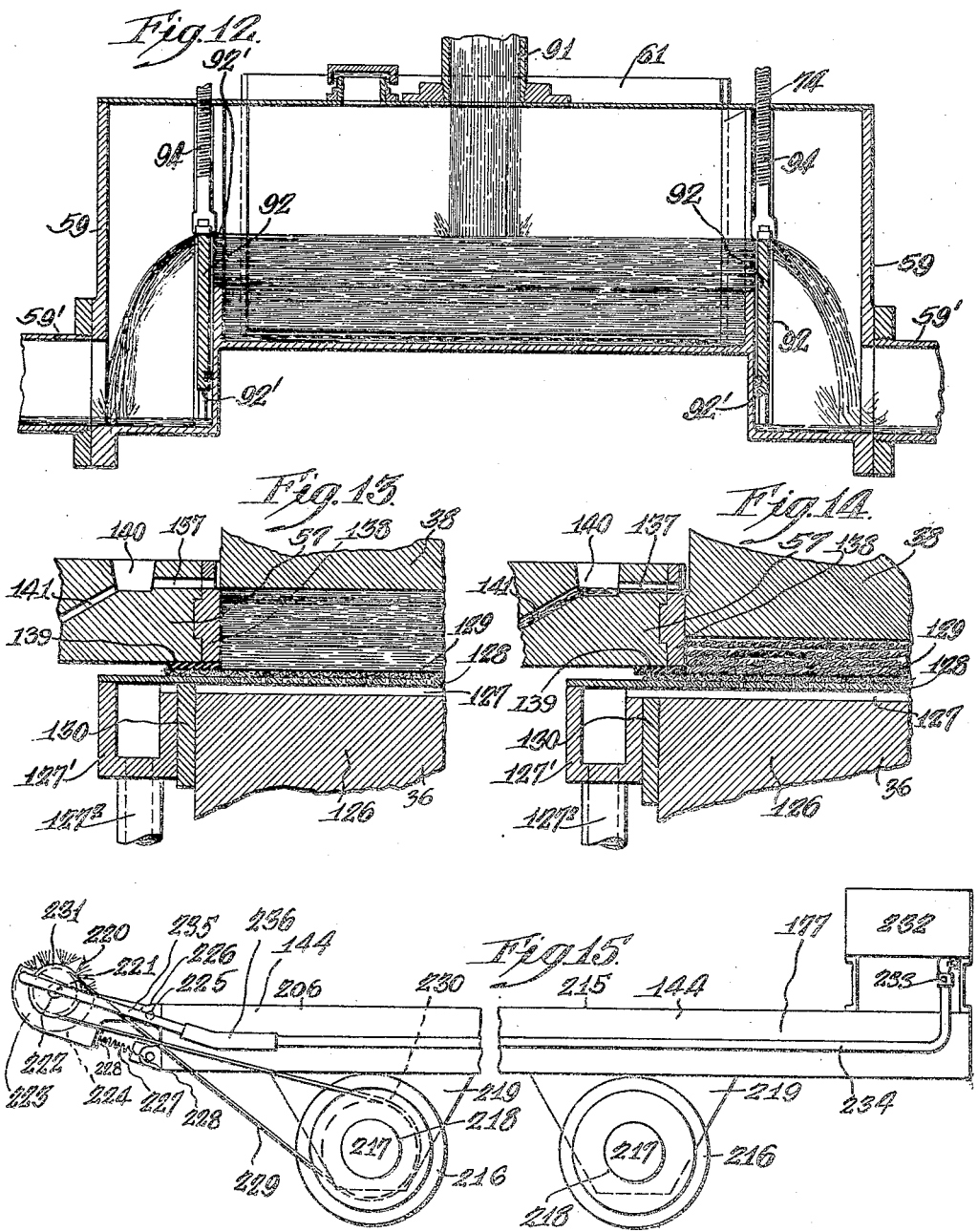

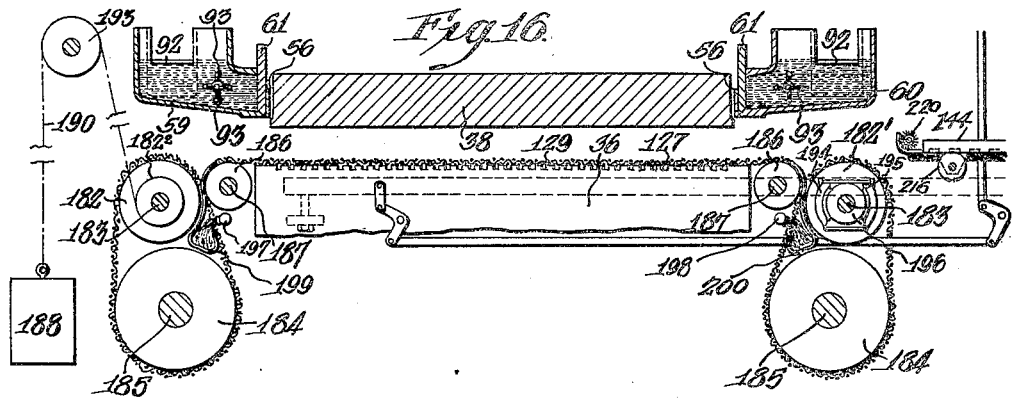
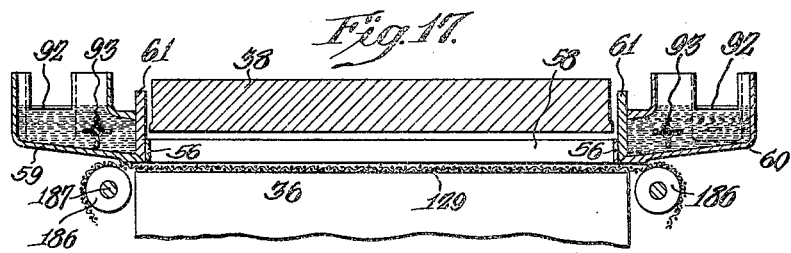
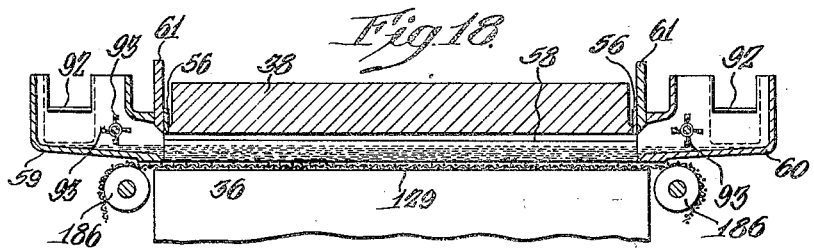
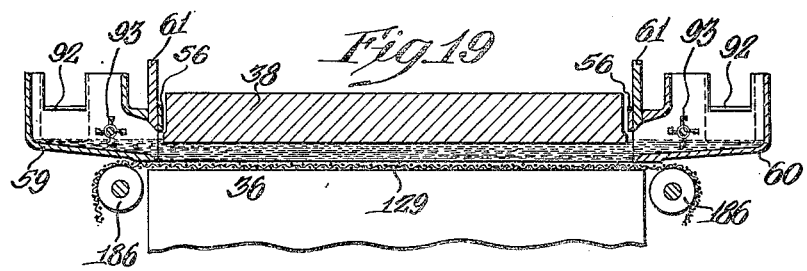

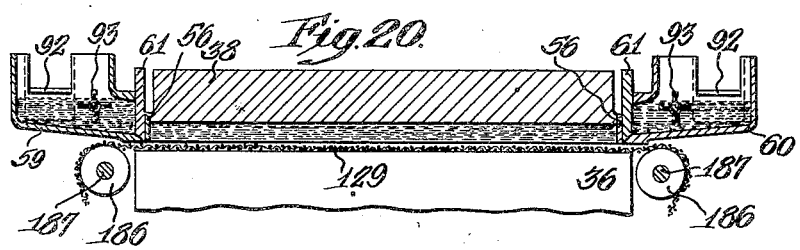
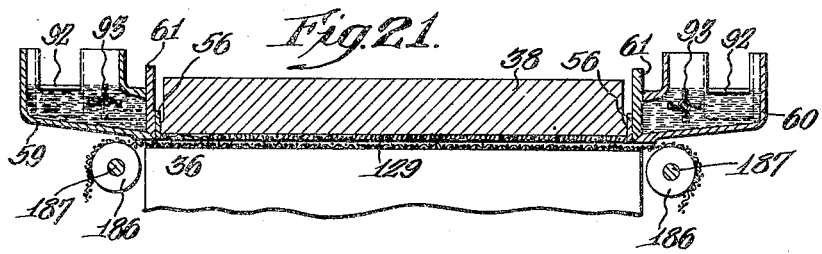
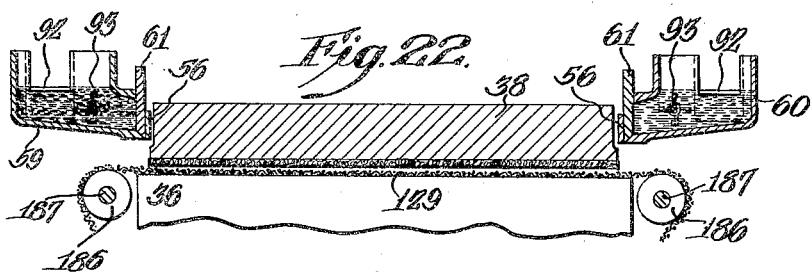
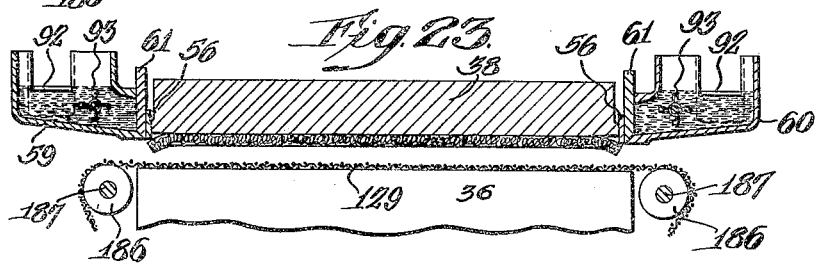
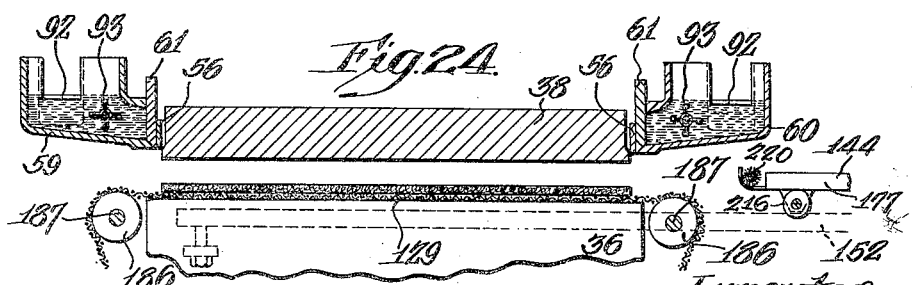

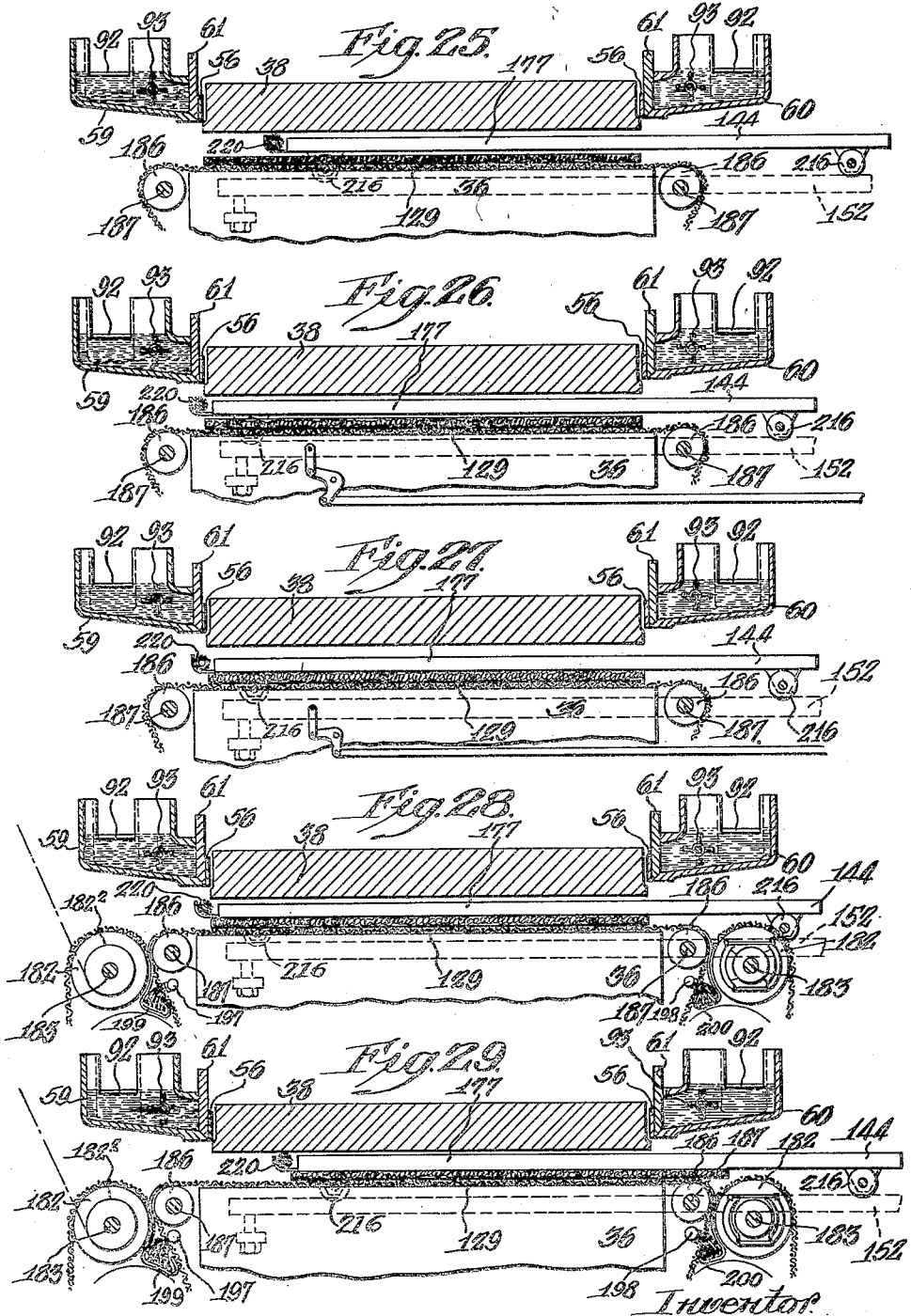

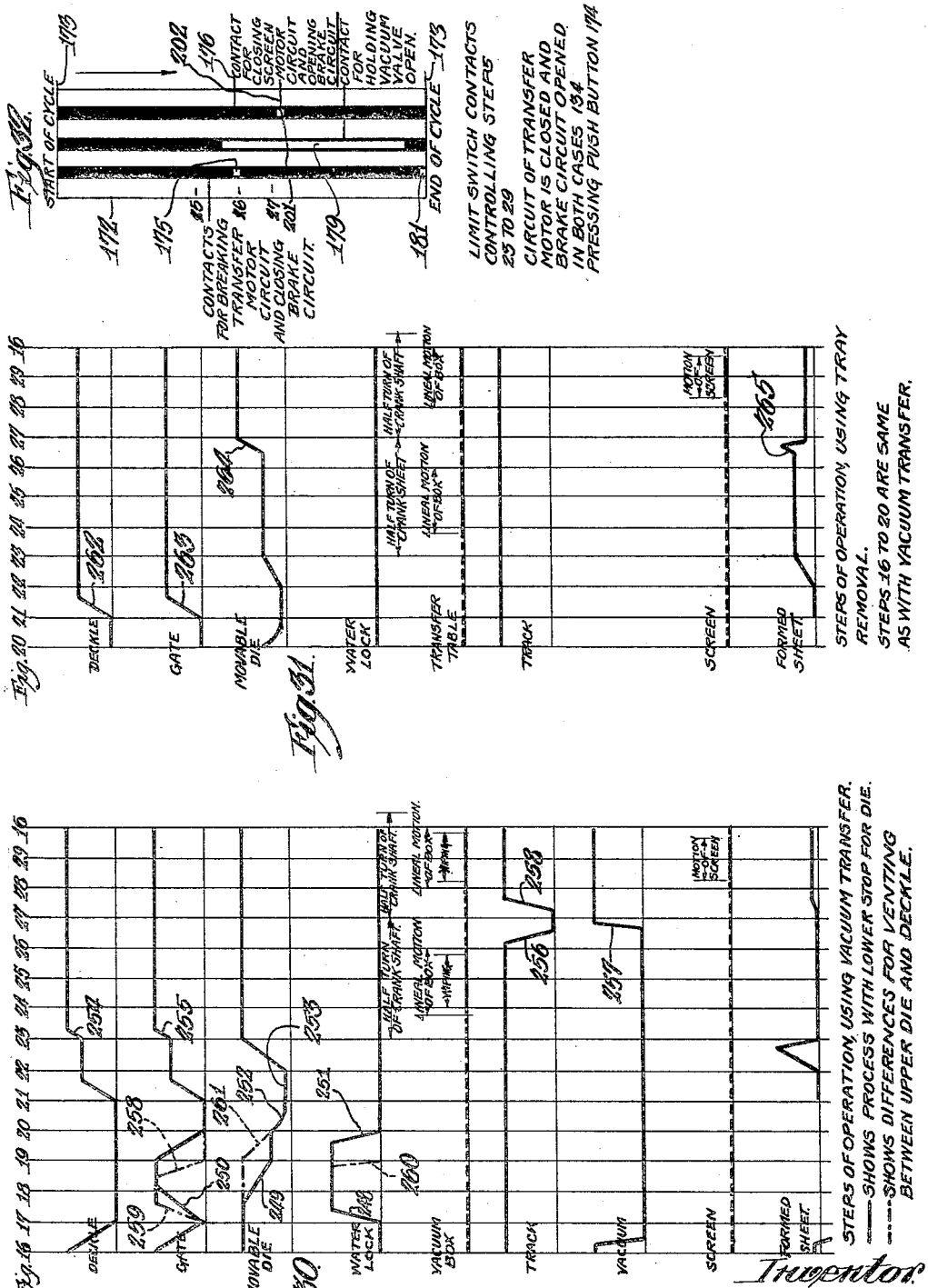

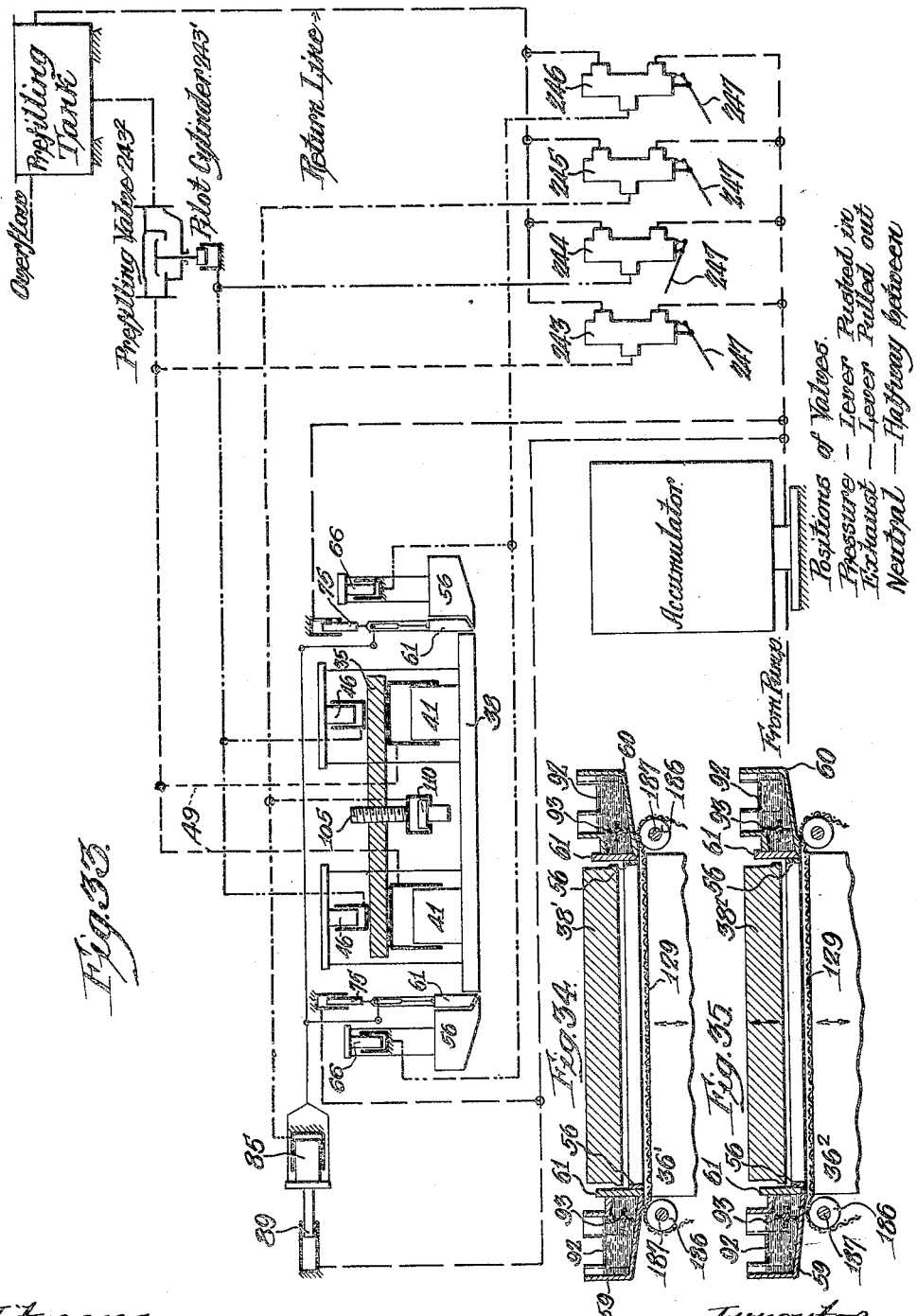

1,907,204

UNITED STATES PATENT OFFICE

HENRI P. L. LAUSSUCQ, OF READING, PENNSYLVANIA, ASSIGNOR TO BIRDSBORO STEEL FOUNDRY & MACHINE COMPANY, OF BIRDSBORO, PENNSYLVANIA, A CORPORATION OF PENNSYLVANIA

SHEET PRESS AND METHOD

Application filed April 4, 1931. Serial No. 527,688.

My invention relates to the manufacture of pressed boards from finely divided fiber.

One purpose of my invention is to provide desirable cycles of operation and mechanism adapted to perform the operations.

A further purpose is to vent a mold initially at the top so as to give free filling flow and subsequently to vent through vertical grooves in the deckle structure when the weight or pressure of or upon the upper die is available to assist the venting.

A further and alternative purpose is to vent a mold through the open gates of the mold.

A further purpose is to use overflow weirs in the flow boxes of structure of the character indicated in order to exactly determine the delivery of mush into the open mold.

A further purpose is to exactly determine the quantity of mush to be operated upon by a die by leaving the gates open until the die has descended into the mush to a definite position, stopping the die at a fixed position which measures the charge and then closing the gates.

A further purpose is to accommodate changes with respect to the desired thickness of the board or/and in the density of the mush by varying the position of a stop that determines a position of the die at which it rests in the mush during closing of the gates of the mold.

A further purpose is simultaneously to adjust the position of upper and lower stops of a die, the upper stop determining the upwardmost position of the die and the lower stop determining the quantity of mush to be pressed by the die into a finished board.

A further purpose is to simultaneously adjust a weir determining the charge of mush that enters the open mold or/and a stop determining the upwardmost position of the die or/and a lower stop determining the quantity of mush to be pressed by the die.

A further purpose is to mount lower stop mechanism of the die upon upper stop mechanism thereof, adapting adjustment of the upper stop to effect a simultaneous adjustment of the lower stop.

A further purpose is to depress the die from a preferably adjustable high position by means of one or more plungers of definite stroke desirably mounted on high stop mechanism and desirably connected to the pressure of the cylinder of the ram which opens the gate.

A further purpose is to use the edges of the deckle to strip the compressed sheet from the die.

A further purpose is to lift the deckles while the die is still under pressure, using a resultant lateral expansion of the sheet beyond the inside line of the deckle to adapt the deckle to strip the sheet from the die when the die carrying the sheet is passed upwardly through the deckle.

A further purpose is to prevent drip from the die on to a finished board by draining upwardly expressed water from the sides of the die through holes in the deckle.

A further purpose is to provide desirable means for removing the finished board from the press.

A further purpose is to wipe and lubricate the bottom of the die after each operation.

A further purpose is to mount lubricating and wiping mechanism on transfer mechanism used to carry the sheet from the space between the dies.

A further purpose is to remove a finished sheet from the lower platen by a vacuum box carried upon a carriage, depressing the carriage track to bring the box into contact with the finished sheet and lifting the track and retracting the carriage along the track.

A further purpose is to alternatively receive a sheet from the bottom of a raised die upon either the top or bottom of a transfer tray, desirably using the movement of mechanism carrying the loaded tray to pass a wiper or/and a lubricator across the bottom of the raised die.

A further purpose is to intermittently move a screen alternately in reverse directions so that spaced portions of the screen respectively cover the bottom of a mold during the pressing of alternate boards, moving the screen so that the last used portion thereof is carried out of the mold for washing, and the other washed portion carried into the mold after each operation.

Further purposes will appear in the specification and in the claims.

My invention relates both to the methods or processes involved and to structure by which the methods may be carried out.

I have elected to show one main form only of my invention, with a few only of the many modifications thereof, selecting a main form and modifications thereof that are practical and efficient in operation and which well illustrate the principles involved.

Figure 1 is a side elevation of structure adapted to be used in carrying out the methods involved.

Figure 2 is a right end elevation in part section of part of the structure shown in Figure 1, illustrating hydraulic low stop and water lock details.

Figure 3 is a fragmentary right hand sectional elevation of the structure of Figure 1 provided with a mechanical low stop.

Figure 4 is a fragmentary section taken upon the line 4—4 of Figure 3.

Figure 5 is a vertical section taken upon the line 5—5 of Figure 1. Most of the structure shown is suited to use with either hydraulic or mechanical low die stop and can be used where no low stop is supplied.

Figure 6 is a fragmentary right end elevation of part of the structure shown in Figures 1 and 5, showing flow box and gate control mechanism.

Figures 7, 7a and 8 are enlarged fragments of different forms of deckle liners, illustrating venting and drainage features.

Figure 9 is a top plan view of structure shown in Figures 1 and 5.

Figure 10 is a longitudinal vertical section through a vacuum box mounted on a transfer carriage, taken on line 10—10 of Figure 9, but omitting the surrounding structure.

Figure 11 is a fragmentary bottom plan view of Figure 10.

Figure 12 is a vertical section taken upon the line 12—12 of Figure 9.

Figure 13 is an enlarged scale fragmentary vertical section taken upon the line 13—13 of Figure 9, showing the die ready to compress the mush.

Figure 14 is a view corresponding to Figure 13 except that with downward die movement the water lock is here open.

Figure 15 is a side elevation of oiling and wiping mechanism shown in Figures 10 and 11.

Figure 16 is a diagrammatic view illustrating the principal parts in the initial phase of operation with the deckle and flow boxes raised, the gates closed and the die in raised position. Figure 16 corresponds to a section taken upon the line 16—16 of Figure 9.

Figures 17 to 29 are fragmentary sections corresponding to Figure 16 in progressively advanced stages of a desirable cycle of operation, using air venting through the gates, low die stop and vacuum pick-up of the finished sheet.

Figure 30 is a diagram illustrating successive stages of various desirable cycles of operation in which full lines show the positions of the parts with a low stop cycle, air venting through the raised gates, compared with a dot-and-dash cycle where the air is vented through air slots in the deckle.

Figure 31 is a diagram for operation alternative to the latter part of Figure 30 showing the sheet supported upon the top instead of held against the bottom of the carrier.

Figure 32 is a view illustrating developed limit switch contacts, laid out to show control stages of suitable sheet transfer mechanism.

Figure 33 is a diagrammatic view illustrating a suitable hydraulic pressure system for operating the different rams in the mechanism of Figures 1, 2 and 9.

Figures 34 and 35 are fragmentary sections corresponding in position to Figure 16 but showing modifications.

Like numerals refer to like parts in all figures.

Describing in illustration and not in limitation and referring to the drawings:—

Wet machines for forming boards and sheets from paper pulp, leather fiber and other commercial fiber suspensions are well known, and therefore much of the illustration, although showing structure, is to be regarded as conventional. The primary purpose of all such machines is to press liquid, usually water, from the raw material suspension to form the raw material into a sheet.

For convenience in designation, I refer to the raw material, whatever its exact nature, as "finely divided fiber suspended in a liquid" or as "fiber", or "mush", and to the finished product, whatever its dimensions, as a "sheet".

Fiber suspensions are difficult to press chiefly because of the extreme readiness with which the fiber precipitates from the liquid. This tendency to precipitate makes it highly important to maintain the fiber flowing continuously in one direction, with as few interruptions as possible, to project the fiber laterally rather than vertically, avoiding sudden dropping into final position, to prevent all escape of liquid suspension medium until precipitation is desired and to charge the mold rapidly and accurately without allowing air to be trapped in the mold.

Another difficulty frequently encountered in wet machines is the withdrawal of the sheet from the mold. In the ordinary wet machine the upper die is smooth and the lower die is foraminated for removal of water. This foramination gives air access so that the pressed sheet does not stick to the lower die but sticks to the upper die where vacuum conditions are created.

The upper surface of the lower die is ordinarily covered by a travelling wire which is often used as a conveyor. When the wire is used as a conveyor the life of the wire itself is shortened; and this wire life is unfortunately short anyhow because the forming of each sheet usually occurs on the same part of the wire. Furthermore, some sheets are still so soft at the end of the pressing operation that they have little lateral cohesion so that they can with difficulty be transferred from the wire after the wire has been withdrawn from the wet machine. As a consequence there is danger of breaking the sheets or of tearing their under surfaces.

While it is customary to construct wet machines with upper movable and lower stationary dies, and this form has therefore been illustrated in most of the figures, lower movable dies are sometimes used. It will be evident, of course, that my invention is equally applicable, whether the upper die alone, or the lower die alone, or both dies are movable.

While the upper and lower dies are of course press platens, the term platen is also applied to parts of the press located above or below the movable die, which are used to support the rams.

The principal parts of the illustrated wet board press or wet machine include top and bottom fixed platens 35 and 36 respectively, tension columns 37, an intermediate platen 38 and a surrounding deckle. The intermediate platen 38 is or carries the upper die and the bottom platen 36 is or carries the lower die.

The upper die 38 is guided at 39 by the columns 37. Its upper surface receives at 40 the lower ends of downwardly directed main rams 41 in cylinders 42 and is connected at 43 near each corner with upwardly extending links 44 that are supported at their upper ends in cross heads 45 from the upper ends of retracting rams 46 operating in suitable cylinders 47. The retracting rams 46 may be of the push-back or pull-back variety. The cylinder is fed through connection 47'.

The cylinders 42 of the main rams 41 are bolted at 48 to the under side of the top platen, hydraulic connections into the cylinders being indicated at 49 above the top platen.

The upper die is maintained in horizontal alinement by equalizers comprising racks 50 secured to the die at 51 and meshing with gears 52 and 53 on shafts 54 and 55.

The deckle 56 includes deckle sides 57 and 58 rigidly connected together at opposite ends of the mold by flow boxes 59 and 60, having gates 61 between the flow boxes and the mold which in effect comprise deckle ends, vertically movable with respect to the deckle sides. I use the word deckle in its broad sense to mean the lateral wall of the mold, including all inlet gates, vent gates, liners and confining walls whatsoever. I do not regard the distinction between the singular and the plural of the word deckle, nor between the side deckle and the end deckle, as critical.

The deckle sides are guided at 62 by the tension columns 37 and are supported and vertically positioned by vertical hangers 63. The hangers 63 are connected at their lower ends to the deckle at 64 and at their upper ends to cross heads 65 of the deckle rams 66. Hydraulic connections for the rams into ram cylinders 67 are indicated at 68.

Figure 2 shows the deckle maintained in more exact horizontal and vertical alinement by equalizers comprising racks 69 upon the hangers 63, meshing with gears 70 and 71 upon shafts 72 and 73.

The gates 61 desirably extend across the full length of the ends of the pulp boxes or flow boxes. The gates slide vertically in suitable guideways 74 on opposite ends of the inner sides of the flow boxes.

The gate operating mechanism is shown best in Figures 2, 5 and 6.

The gates are continuously pressed downwardly toward closure by vertical gate rams 75, one for each gate, in cylinders 76 having fluid connections 77, which operate preferably under constant pressure. The connections between the gates and the ram 75 are made through vertical rods 78 attached at 78' to the superstructure 79 of the gates.

The gates are adapted to be lifted against the heavy downward retraction of the constant pressure rams 75, without lifting the deckle, by means of rocker arms 80 which make connection with slotted links 81 by means of pins 81'. The lower ends of slotted links 81 make pivotal connections at $81^2$ with the gate superstructure 79.

The rocker arms 80 are rigidly fastened to a rocker shaft 82, journaled in suitable bearings on the top platen, and connected through a crank 83 and a connecting rod 84 with a horizontal gate-opening ram 85 in a cylinder 86 having fluid connection at 87.

A smaller ram 88 having a cylinder 89 and fluid connection at 90 is integral with and opposed to the gate-opening ram 85, and the latter ram being preferably under constant pressure, heavily retracts the gate-opening ram 85 and thereby the rocker shaft 82 to the position of gate closure.

The slotted link and pin connections at 81 and 81' permit upward movement of the deckle, including the gates, as a single unit without changing the positions of the rocker arms 80, and, if the deckle is all the way down, permit opening and closing the gates without movement of the deckle. The gates lift against the downward pressure of the constant pressure rams 75 by the action of the horizontal gate-opening ram 85 through the rocker shaft 82 and links 81, and close by action of the constant pressure rams 75, upon releasing the horizontal gate-opening ram 85. The constant pressure ram 88 will return the ram 85 to its original position and at the same time will return rocker arms 80 to starting position, acting through links 84, rocker arms 83 and shaft 82.

When the deckle is raised, the gates are normally always closed under the heavy downward retraction from the constant pressure rams.

Desirable features of my invention are included in the structure of the flow boxes alone along with cooperating structure on the wet machine that permits simultaneous adjustments of the rest positions of the die and of the quantity of fiber delivered from the boxes into the mold during each cycle of the wet machine.

The flow boxes 59 and 60, (Figure 12) rigidly connected to the deckle, are provided with inlet pipes 91 and with overflow weirs 92, preferably vertically adjustable.

Stirrers 93, (Figure 16) driven by motors 93' (Figure 9) through gearing $93^2$ and chain drives $93^3$, keep the fiber in the flow boxes constantly stirred.

The overflow weirs 92 exactly determine the volume of mush charged into the mold preparatory to the pressing of the sheet. Four weirs are shown, one at each end of each flow box, and the four weirs are desirably adjustable as a unit and with stops later to be referred to.

In the illustration, the weirs are vertically adjustable in vertical slideways 92' by individual vertical screws 94 that journal in the superstructures of the boxes and carry worm wheels 95, meshing with worms 96 on horizontal cross shafts 97 journaled at 97'. One cross shaft 97 is provided for each box.

The cross shafts 97 make bevel gear connections at 98 and 98' with vertical shafts 99 which carry worm wheels 100 at their upper ends. The worm wheels 100 mesh with worms 101 on an adjustment shaft 102, so that the vertical positions of the four weirs are adjustable simultaneously by suitably turning the shaft 102.

As illustrated in Figure 9, the shaft 102, normally stationary, is operatively connected at 103 through reduction gearing to a reversible motor 104.

Provision is desirably made for securing simultaneous adjustments of the vertical positions of the weirs and of stops that determine the high positions of the die, and/or of stops that determine intermediate rest positions of the die.

Mechanism is shown in Figure 5 limiting the upward movement of the die, the purpose of this mechanism being to secure exact registry of the initial raised position of the die so that the die will be high enough for the intended purpose but not higher than needed.

The stop mechanism includes heavy vertical screws 105 adjustably threading downwardly through the top platen and presenting their lower ends to be engaged by the top of the upper die.

As illustrated, the top platen 35 carries heavy nuts 105' flanged at their under sides and fastened into the top platen, the screws 105 being threaded through the nuts 105' to limit the upward movement of the die.

The screws 105 extend some distance above the top platen, the upwardly extending portions carrying worm wheels 106 splined to the screws and meshing with suitable worms 107 upon an adjustment shaft, which is illustrated as being and preferably will be the same shaft 102 operating the adjustments of the weirs 92. The reversible motor 104 then effects simultaneous adjustments of the weirs and of the high position of the die.

One desirable feature of one form of my invention is directed to the use of the gates 61 as vents for air or for excess fiber, expelling the air or excess fiber from between the open gates. When the air or fiber has been expelled during the early portion of the downward travel of the die, so that the die has reached the position at which pressing will begin, the die will preferably be stopped to allow time to close the gates before opening the water locks and beginning the pressure stroke of the die, or if the back pressure be reduced by opening the water locks during the final movement of the gates the upper die can continue to move without appreciably forcing mush back from the mold into the flow boxes. Of course objectionable wire drawing must be avoided for various reasons including the local relief of mush at the wire-drawn points which would affect the character of the sheet pressed.

As will later be seen the water locks are opened anyhow for other reasons slightly before the final closing movement of the gates. The speed advantage of having the head continue to move must in any event be balanced against the possible disadvantages of back flow of mush to the boxes.

The lower stop mechanism and suitable connections, where used, are intended definitely to stop the die after downward die movement with the gates open has expelled the air and/or excess fiber from between the dies through the open gates. The die is brought to rest at a predetermined definite position for the purpose of gauging the quantity of mush in the mold. The upper die is held in position while the gates are closed and preparatory to opening the water lock.

In accord with this feature of my invention, the die is stopped in its downward movement when it engages the fiber, or, after it has engaged the fiber, when it has squeezed out any surplus of fiber through the open gates. The gates are preferably wholly closed while the die is stopped and before the fiber is pressed. Of course the gates could be closed as stated while the die is in motion, but this would complicate accurate predetermining of the charge in the mold.

It is usually desirable to have a definite vertical spacing between the high and low stop positions of the die and my preferred method of operating the press makes the low stop position definitely dependent upon and at a definite distance below the high stop position.

As shown in Figure 2, the lower ends of the screws 105 may carry downwardly directed cylinders 108 having fluid connections at 109. From within these cylinders, pistons 110 and rods 111 extend downwardly to press the rods against the top of the movable die, the upward movement of the die stopping at its high position when the rods 111 and the pistons 110 reach the upper limits of their strokes, as by engagement between the tops of the pistons 110 and the insides 112 of the tops of cylinders 108.

The upper ends of the cylinders 108 have desirably hydraulic pressure connections at 109 in parallel with the connection operating the horizontal ram 85 that lifts the gates, so that when hydraulic pressure is applied to this ram to open the gates, there is a simultaneous application of the same pressure inside the cylinders 108 and against the upper ends of the pistons 110. This pressure pushes the pistons 110, and thereby the die 38, downwardly to the lower limit of the range of movement of the pistons 110, the pistons stopping when they come against the bottoms 113 of the cylinders 108.

It will be understood that the upward movements of the gates are relatively rapid as compared to the downward movement of the die, so that the downward movement of the die takes place with an accompanying gradual and relatively slow filling of the main cylinders 42 which are of relatively great sectional area as compared to that of the cylinder of the horizontal ram 85.

The gates are thus raised and the mold receives its full charge of fiber while the die is still raised well above the fiber, the downward movement thereafter of the die venting the air through the open gates until the die comes to rest with its bottom in full engagement with the fiber.

The downward movement of the die may be merely such as to fully engage the top of the fiber without pressing any material quantity thereof back through the open gates. This full engagement of the die with the fiber and full exclusion of air is made more sure if there be a definite flow of fiber from the mold through the gates, forced out by the die, even if the amount of this flow be small.

Optionally, particularly in forms not using the weirs, the quantity of fiber displaced back into the boxes may be considerable and may be variant to accomodate inadvertently variant deliveries from the flow boxes.

Differences of density in the mush and differences in the desired thickness of the sheets may be accommodated by suitable changes in the low stop positions, affected, for example by changes in the settings of the high stop screws 105 as by means of the reversible motor 104. Changing the setting of the high stop, as described herein may be used to effect a corresponding change in the setting of the low stop; but the low stop position is the important position.

Most desirably the high and low stops and the weirs are adjusted simultaneously, as by the adjustment of all by means of a motor 104 which is common to all. The adjustment accommodates variant fiber density and differences in the desired sheet thickness, the low rest or stop position of the die being desirably merely low enough for the die to make full engagement with the surface of the fiber and the period of rest of the die at this position being then merely that needed to close the gates.

In the mechanical low die stop structure shown in Figure 3, vertical tension bars 114 are rigidly fastened at their lower ends to the upper die opposite the high stop screws 105 and extend upwardly to slide through perforations 115 of the top platen with up and down movement of the die.

The bars 114 have shear pin connections 116 with the outer ends of a yoke 117. Each yoke 117 has a vertical central hub 118 loosely surrounding an upward extension 119 of one of the screws 105. Each screw 105 which carries the extension 119 is shouldered at 120 to support the plate 121.

Between the lower ends 118' of the hubs 118 and the plate spaces 122 are provided in the upper positions of the hubs for stops 123 in the form of shiftable blocks. When the blocks are in the positions shown in Figure 3 they permit the upper die to be raised and lowered. The upper positions are set by the positions of the lower ends of screws 105. Though one only of these block-holding mechanisms is shown in Figure 3 it will be evident that each of the bars 105 can be equipped correspondingly so as to balance the structure. When the blocks 123 are moved to the right in Figure 3 the upper die 38 is prevented from lowering by gravity by more than the separation of the block from the hub 118.

The plate 121 is, of course, stationary in any set position of the high stop screw and the hub 118 reciprocates up and down with the upward and downward movements of the die, so that complete control of the gravity and pull back movements of the die can be effected by movement of the block. Pressing movements of the die are not prevented. They shear the pins 116 if improperly operated.

I control the movement of the block or blocks 123 into and from positions between the hub 118 and plate 121 in coordination with openings and closures of the gates 61. The blocks move in when the gates open to fill the mold and out simultaneously with the closing of the gates, thus bringing the downwardly moving die to rest with the gates open after the air has been expelled through the open gates and releasing the die to continue the downward movement after the gates have been closed.

One of many ways of coordinating these movements is shown.

The blocks 123 are moved in and out by the operation of the rocker shaft 82 that opens the gates, this rocker shaft carrying arms 124 that make link connections 125 with the blocks 123. Suitably loose connections are provided through pins 124' between the arms 124 and the links 125 which operate the blocks, such that the blocks are not moved outwardly until the rocker shaft 82 reaches a position permitting complete closure of the gates.

It will be understood that the closing movements of the gates are responsive to the downward pressure in the constant pressure gate closing rams so that the return movement of the rocker shaft 82 with this type of low stop is desirably made during the latter part of the closure of the gates and the last portion of the angular movement of the rocker is used to move out the blocks 123.

The depth of fiber in the mold may be adjusted to accommodate for any changes in the desired thickness of the finished sheets or/and in the density of the mush or of the final sheet.

It should again be noted that my illustration uses a downwardly movable upper die, but that the invention is capable of use with either or both dies movable. What I have indicated regarding upper and lower stops should therefore be interpreted in this light as meaning outward and inward stroke limitations for the movable die or the ultimate limit of movement away from or toward each other of two movable dies.

Whatever the structure when a stop is used to limit the approach of the two dies, one toward the other, it is advantageous to be able to adjust the position of this stop in order to accommodate different mush filling thicknesses suited to different thicknesses of ultimate sheet or different intended densities of compression of the sheet, or to accommodate varying fluidities of the filling material used. I provide for such an adjustment and definitely make this inner (in the illustration lower) stop adjustment as a temporary limit of stroke so as to avoid an unnecessary extent of movable die travel. I have not shown separate adjustments for the two stops, notwithstanding that such separate adjustments are entirely practicable and would themselves be of value if the greater value of adjustment common to both be not sought.

I have therefore intended to include the less desirable within the more completely effective common adjustment for both stops.

Notwithstanding that the adjustments of both stops find their highest efficiency in connection with an adjustment of the height of the weir, the variations of the positions of the two stops, varied separately or together, have an independent value and even when there is no interconnection between the height of the weir or heights of the weirs—where more than one is used.

Moreover in the flow box discussion, and, particularly in the use of the flow box capacity as a measure of the quantity of filling material to be inserted within the mold, or within that part of the mold served by this flow box, it must not be overlooked that the capacity of the flow box contemplated is that capacity above the level in the flow box at which the fluid comes to rest in the interconnected flow box and mold; and that any alteration of the height of the flow box increases this capacity in the proportion that the new height changes this capacity above the ultimate flow box and mold level.

Usually it is desirable to let the height of the weirs 92 determine the quantity of mush to be operated upon by the die, adjusting the lower stops to bring the die to rest when the bottom of the die reaches full engagement with the surface of the mush within the mold, the volume of mush forced back by the die being small, preferably corresponding in height of die movement to the difference between the maximum and minimum resting heights of the filling material and thus differing with the flowability of the material and the time allowed for setting. It is desirable to have the gates wide open to permit easy egress of air from between the die and mush and unchecked flow of the mush displaced from the mold.

In this more desirable arrangement, the quantity of mush within the mold operated upon by the die is determined by the height of the weirs and the invention at its best contemplates simultaneous adjustment of the lower stops or/and of the upper stops whenever the weir height is adjusted, such adjustment being made when changes occur in the character of the mush or in the desired thickness of the sheet.

The bottom die carries a filter bed permitting easy downward expression of water from the mush.

As illustrated, the top of the main casting 126 of the bottom die is provided with a succession of transverse drainage grooves 127. The grooved surface is covered by a foraminated plate 128, which is in turn covered by a movable screen or wire 129 of perhaps 40 or 60 mesh, desirably shifted and washed after forming each sheet.

Provision is made for preventing the downward escape of water from the mush during the period that the mush is filling the mold and until the mush has reached its filling level and preferably until the die has moved down and squeezed out any excess of mush which is to be removed from the mold, thus avoiding uneven precipitation of fiber in the mold and lines of weakness in the formed sheet where fiber masses separately precipitated meet but fail to interlock because they have not settled exactly together.

A desirable feature of my invention is directed to the construction of the waterlock on the bottom die and to waterlocking the mold while the mush is entering the mold and until the die has expelled the air and/or excess mush from the mold and is ready to start upon its final downward pressing stroke. The waterlock must not open long enough before the pressing stroke of the die to allow drainage to lower the mush level and thus produce a void which the air will fill; nor should the die start its pressing stroke while the gates are open appreciably unless it merely follow up the lowering of the level due to natural drainage.

In the illustrated waterlock, (Figures 2, 5, 13 and 14) new to me but claimed in another application, Serial No. 540,155, filed May 26, 1931, vertical slide valve plates 130 are mounted so as to slide vertically to open and close the ends of the drainage grooves 127. The waterlock slide valve plates 130 are operated by suitable links 131 connected at their lower ends to counterweighted rocker arms 132, which tend to raise the valve plates to closed position.

When the waterlock is open the counterweighted ends of the rocker arms 132 are raised by flexible connections 133 that pass upwardly over pulleys 134, to a pulley or drum 135 mounted upon the shaft 82 operating the gates. The open position of the water lock corresponds to the closed position of the gates 61. Angular movement of the rocker shaft 82 to open the gates 61 lowers the counterweighted rocker arms 132 and thereby closes the waterlock slide valve plates 130.

As illustrated the waterlocks are always open if the gates be closed, and preferably always tightly closed if the gates be open, the closure being effected by the counterweights when the turning of the shaft 82 permits downward movement of the rocker arms 132.

The gates 61 may be closed while the upper die 38 is still spaced above the top of the mush where final venting takes place around the edges of the upper die and my invention includes (alternatively) structure permitting easy venting of the air from between the bottom of the upper die and the top of the mush (Figures 5, 7, 7a, 13 and 14) during the movement of the dies relatively closer together.

Air may escape, as seen in Figure 7, through laterally spaced vertical vents 136 that extend as grooves 136' downwardly for a suitable distance on the inside of deckle liners 138 carried by the deckle sides 57 and 58 and optionally also by the gates.

The height of the deckle liners 138 and the vertical position of the lower ends of the vents 136 should be such that until the upper die 38 has properly engaged the surface of the mush the air is free to escape through the grooves. The best position for the vents is at the middle of the sides midway between the gates.

Desirably the lower ends of the vents 136 are at or slightly lower than the level of the free surface of the mush about to be engaged by the upper die, but the grooves 137 should preferably not extend much below this level.

At suitable intervals the deckle liners 138 are provided with drain openings 137, (Figure 13).

When the upper die 38 enters the mush, some of the mush and more of the liquid presses up around the sides of the upper die inside the deckle. If this mush and liquid are not drawn off, they will drop on to the sheet when the dies are again moved apart, (when stripping takes place) thus softening the edges of the sheet. The drain openings 137 carry away the mush and liquid into a suitable trough 140 led to a white water chest through a connection 141.

A suitable gasket or pad 139 (Figures 13 and 14), preferably made of rubber or leather and carried by the bottom of the deckle, seals the mold against the wire 129.

Desirably the upper die 38 is also provided with outer plates 142 (Figure 5) that register properly with the deckle liners 138 and take the lateral wear on the die.

It will be understood that when there is to be any very material change in the thickness of the finished sheet, the deckle liners 138 are preferably changed, because liners having grooves 137 located for one height of mush are but imperfectly adapted to function if the depth of mush be, for example, twice as great to produce sheets of double thickness.

One material advantage in the form that vents through the open gates is the avoidance of any need for vent grooves in the liners of the deckle and this form therefore permits the use of the same liners in making sheets of widely variant thicknesses.

Optionally the laterally spaced grooves 136 may be replaced by a continuous recess along the length of the liner as indicated at 143 in Figure 7a.

The drain openings 137 may be advantageously used even without vents 136, as shown in Figure 8, to remove liquid accumulating between the deckle and the upper die during pressing.

Coordinated mechanism for removing the finished sheets from beneath the dies, for oiling or wiping the bottom of the upper die and for shifting and washing the portion of the wire covering the upper surface of the lower die are best seen in Figures 1 and 9, where they are shown somewhat diagrammatically.

I effect transfer of the formed sheet from the mold in a novel manner by means of a carriage 144 which moves into the mold when the deckle is raised, and travels from the mold with the sheet.

As I have previously indicated, the sheet ordinarily adheres to the surface of the upper die after pressing. An important feature of my invention is the method employed for separating the sheet from the upper die and for transferring the sheet from the mold after separation. I find that, when pressure is applied to the sheet after the support of the deckle is withdrawn from the edges of the sheet, the edges grow laterally beyond the original confines of the mold. I may subsequently separate the sheet from the upper die by moving the upper die upwardly to the height of the lower edge of the raised deckle, or by moving the deckle downwardly below the lower edge of the upper die while the dies are separated.

After separation of the sheet from the upper die I may catch the sheet upon my carrier, or allow the sheet to drop to the lower die and subsequently lift the sheet by means of the carrier and transfer it from the mold. In either of these modes of operation, the separation of the sheet by pressure upon its grown edges serves as a positive controllable release for the sheet, so that I can reliably determine not only that release will occur but exactly when release will occur, catching the sheet immediately after release, or if I prefer, picking the sheet up from the lower die, or transferring the sheet from the mold in any other suitable manner.

It will be evident that the supporting, moving and control means for the carriage 144 are subject to wide variation. I have selected for illustration a combined mechanical and electrical means from among the many types of apparatus which could be used, such as hydraulic, pneumatic, mechanical, electrical and various combinations of these, because I consider the form shown to be the most simple and satisfactory in operation, and not because the other forms available would not be suited to perform this function.

A motor 145, Figure 9, connects through a suitable speed reducer 146 and gears 147 and 148 with a control shaft 149. The electrical controller of the motor at 150 automatically stops the motor at the end of each one-half rotation of the control shaft 149, as later explained.

The control shaft 149 carries cams 151 for shifting the vertical height of a carriage track 152 that supports the carriage 144 used in removing the finished sheets and preferably also in wiping or oiling the bottom of the upper die.

The control shaft 149 is also provided (Figure 1) with cranks 153 which connect by links 154 to long-stroke rockers 155 that pivot at 156 and make link connection 157 at their lower ends to the carriage 144. When the deckle 56 is raised, rotation of the control shaft 149 counterclockwise 180° from the position shown in Figure 1 moves the carriage 144 into the mold beneath the upper die and above or below the finished sheet, depending upon whether the sheet still adheres to the upper die 38 or has dropped to the wire 129 on the upper surface of the lower die 36. One form of transfer mechanism involves the use of a vacuum box to lift the sheet from the lower die. For this to be most effective the vacuum box must be brought into close contact with the surface of the sheet and then the sheet must be relatively moved away from the bottom die. I preferably accomplish this by vertically shifting the track 152 and carriage 144 by the track cams 151.

The track cams 151 are of variant form depending upon how the sheet is to be removed from between the dies and how it is to be delivered from the transfer mechanism. As illustrated, cam lugs 158 (Figure 1) depress the track by depressing the ends of rockers 159, pivoted at 160, connecting through short horizontal rockers 161, (Figure 9), pivoted at 162, to the upper ends of long links 163. The lower ends of the long links 163 are connected to rocker arms 163' upon shafts 165 journalled at 166 in the track support 167. On the shafts 165 rockers 168 counterweighted at 169 (Figures 2 and 5) support the track 152 through links 164 and vertically position it.

A unit for switching the motor out of the circuit after each counterclockwise 180° rotation of the shaft is indicated at 170 (Figure 9) connected by a crank 171 to the crank 153 on one end of the control shaft 149.

While the switch 170 may be a commercial unit, and therefore not in itself part of the invention, the angular positions of the contacts of the switch are illustrated in the developed commutator 172 of Figure 32.

As indicated, beginning the sheet transfer cycle at the line 173, Figure 32, the control shaft 149 starts to rotate counterclockwise when a suitable starting button 174 (Figure 9) in the circuit of the motor 145 has been pushed by an operator or by mechanism synchronized with the operation of the press.

The motor rotates the cranks 153 to a position 180° removed from that of Figure 1, bringing the carriage to its extreme inward position within the mold, a suitable contact 175 (Figure 32) of the switch mechanism 170 stopping the motor 145 at the line 176 when this position is reached, as by opening the motor circuit and applying a suitable brake to bring the motor promptly to rest.

Just before the cranks 153 come to the end of their 180° travel, the cam lugs 158 may depress the track through the long links 163 and other connections bringing a vacuum box 177 carried by the carriage 144 to position upon the top of the finished sheet. As a precaution against injury to the carriage 144 in case the upper die 38 is lowered while the carriage is in the mold, I provide a resilient connection 178 in the link 163, allowing the carriage to move downward under pressure until it gains the support of the lower die.

The vacuum will preferably be applied to the box 177 at or a little after the time at which the box comes in contact with the sheet, as by a contact 179 (Figure 32) beginning near the line 176 on the switch commutator 172.

The motor 145 is then again started, as from the switch 174, either by an operator or by suitable mechanism synchronized with the press. The further rotation of the control shaft 149 first lifts the track 152 and therefore the carriage 144, the vacuum box 177 and the finished sheet when the cam lugs 158 pass out of contact with the ends of the rockers 159. Then the carriage 144 is retracted from the mold, maintaining vacuum connection with the vacuum box 177 to support the sheet as shown by the extent of the contact 179 (Figure 32). The sheet may be handled, after removal from the mold, by any suitable mechanism, such as the roller transfer 180.

The switch 170 shuts off the motor 145 by a suitable contact 181 (Figure 32), operating upon the controller 150, when the carriage 144 reaches its initial position, first cutting off the vacuum when the switch commutator 172 passes the end of the vacuum contact 179.

The carriage 144 may, if desired, be again depressed as it reaches its retracted position to deposit the sheet upon the roller transfer 180, the vacuum shutting off in any suitable way to drop the sheet upon the transfer rollers by means of the switch 170 or optionally by using the depression of the carriage to close the suction valve and open to atmosphere, actuated at or a little before the picking up of the sheet.

The moving screen or wire 129 beneath the sheet upon the bottom die should be washed after each forming operation.

The wire 129 is mounted so that it can be longitudinally shifted after each sheet removal, the direction of shifting desirably alternating so that the same but preferably adjustably spaced portions of the wire alternately cover the bottom of the mold.

In Figure 1, the ends of the wire 129 are wrapped about winding drums 182 and 182' journalled at 183 beneath the flow boxes 59 and 60, the intermediate portion of the wire passing downwardly under large guide rolls 184, having bearing support at 185, and thence upwardly over rolls 186 journalled at 187 at opposite ends of the bottom die. The portion of the wire between the rolls 186 covers the top of the bottom die, forming the bottom of the mold.

The wire 129 is kept under constant tension by a suitably heavy weight 188 supported from a pulley 189 on a flexible connection 190. One end of the flexible connection 190 is secured at 191 to a vertical frame 192, and the other end of the flexible connection 190 is wound upon the winding drum $182^2$, coaxial with the drum 182, at the nearer end of the machine. Between its extremities the flexible connection 190 is carried over a pulley 193.

The pull of the weight 188 on the flexible connection 190 tends to wind up the screen upon the drum $182^2$ at the left of Figure 1. Such winding is normally prevented by a magnetic brake 194 applied to the drum 182' at the right of Figures 1 and 16. The drum 182' is also operatively connected through suitable speed reducing mechanism 195 to a reversible motor 196, capable of winding up the wire on the drum 182' after it has been wound upon the drum 182 under the action of the weight 188, or unwinding the wire from the drum 182' and allowing the wire to wind upon the drum 182 by the weight 188.

Sprays for any suitable liquid to wash the wire, as for example water, are provided at 197 and 198, and catch basins 199 and 200 are located below the respective sprays to remove the liquid and fiber.

The motor 196 drives the drum 182' for short periods during the removal of the sheet from between the dies, the directions of operation reversing with successive sheets in order to shift the screen, first in one direction for one sheet and then in the reverse direction for the next sheet.

The motor 196 and the magnetic brake 194 operate alternately, so that the magnetic brake is deenergized while the motor is in operation and is energized as soon as the motor circuit is opened.

The circuit of the motor 196 may desirably be closed by a controller 150' actuated by connections at the switch 170 on the control shaft 149, as by a contact 201 at the line 202 of Figure 32. The motor circuit may be opened alternately at the end of each shifting cycle of the wire by the controller 150', actuated by a switch 205 (Figure 1) thrown by projections 203 and 204 from the flexible connection 190, the motor thrown-out being effected by one projection or the other, according to the direction of rotation of the motor.

It will be seen that the part of the screen presented on the surface of the lower die can be varied by varying the location of the cut-out projections 203 and 204.

Some of the desirable features of this form of screen include the ease with which the tension of the screen may be maintained uniform; the avoidance of any seams over the lower die surface, normally periodically present when the screen is made endless; the convenience in varying the portion of the screen used in the mold; and the ability to use commercial screens of somewhat indefinite lengths.

A desirable feature of the invention is the form of vacuum box 177, illustrated in Figures 10, 11 and 15, optionally used in picking up the sheet after the sheet has been stripped from the bottom of the upper die.

As illustrated, the main body of the box 177 comprises a heavy metal plate 206, desirably steel.

The downwardly directed lifting surface 207 of this plate is externally bounded by a polished metal strip 208 fastened to the bottom of the plate by screws 209, preferably upon rubber gasket strips 210. Spacers 211 are welded at intervals to the lifting surface of the plate 206 and a suitably perforated sheet metal or woven wire cover 212 lies below the spacers and is secured at the edges by the metal strip 208 as at 213.

The polished metal strip 208 preferably extends downwardly slightly further than the lowest portion of the lifting surface, and particularly lower than the bottom of the perforated cover 212. Vacuum connection is illustrated at 214 to the space between the plate surface 207 and the perforated cover 212.

The valve to a source of vacuum may desirably be operated directly or indirectly by cam mechanism on the control shaft 149 or by other suitable means, automatically or by hand, timed to apply vacuum when the box is ready to pick up a sheet from beneath the die and to release the vacuum when the carriage is supporting the sheet in proper position to deposit it upon suitable transfer rollers 180.

The upper surface 215 of the vacuum box 177 is made flat so that, alternatively, it may catch a sheet adhering to the upper die and transfer it from the mold.

The carriage 144 is desirably provided with wheels 216 mounted on outboard stub axles 217, fastened at 218 in brackets 219 extending from the carriage. The wheels 216 move on the track 152, which shifts vertically as previously explained.

Another desirable feature of the invention includes provision for wiping and/or lubricating the bottom of the upper die.

In the illustrated forms the carriage 144 carries, in cooperative relation with transfer mechanism that may comprise either a vacuum box 177 or a tray surface 215, suitable mechanism for wiping and/or oiling the bottom of the upper die.

Figures 10, 11 and 15 illustrate a suitable vacuum box and tray which may be used. The two may be considered as alternative or in combination. For example, if the tray transfer is to be employed, the vacuum box may still be used where, as sometimes happens, the sheet does not adhere to the upper die. Figure 15 may be a tray, a vacuum box, or both.

As shown in Figure 15, the wiping and oiling mechanism includes a rotary brush 220 on a shaft 221 journalled at 222 in sides 223 of an oil basin 224. The oil basin 224 is pivoted at 225 to brackets 226 from the carriage 144. Springs 227 acting against spring sockets 228 at opposite ends force the oiling brush resiliently upward, so that, when the carriage is in the mold, the oil brush will maintain contact with the lower surface of the upper die 38.

The brush 220 may be operatively connected to the wheels 216 of the carriage, as by a resilient belt 229 in pulleys 230 and 231 on the respective shafts 221 and 217, so that the brush rotates during travel of the carriage and preferably has a direction of rotation such that the engaging portion of the brush is moving opposite to the direction of travel of the carriage, thereby making the wiping action more effective.

The brush dips into the oil pan or basin 224, the lower bristles picking up oil from the bottom of the pan and depositing it upon the lower surface of the upper die 38.

Desirably the oil is supplied continuously to the pan or basin 224 during the operation of the wet machine, an oil supply tank 232 delivering oil to the pan or basin 224 through a sight feed 233 and through pipes 234 and 235, connected resiliently at 236.

Whenever removal of the sheets is to be by vacuum pick-up, the sheet will have been already stripped from the upper die before the carriage and vacuum box move in under the die.

In this event, the progressive wiping or oiling of the bottom of the upper die takes place during the inward movement of the carriage and also during the outward movement thereof, the upper die having been brought to rest in a vertical position such that it may be engaged by the brush during the inward and outward travels of the carriage.

When I elect to use tray removal of the finished sheets, the carriage moves in under the upper die while the sheet is still adhering to the bottom of the upper die, and, to avoid danger of the sheet falling prematurely from the bottom of the die it may often be well to omit oiling the bottom of the upper die.

If operating conditions are such that the sheet will reliably stick to the upper die until stripped by engaging the deckle, as for example when the sheets are relatively thin, it may be desirable to oil the upper die to make stripping more easy and rapid. Or, if preferred, the upper die and deckle may be moved up far enough to clear the oiler while the carriage is moved in, and then the upper die may be lowered into the path of the oiler before the carriage is moved out of the mold.

In tray removal, after the carriage reaches its inner position beneath the sheet, while the sheet is still adhering to the upper die, the upper die is raised into the deckle or the deckle is lowered about the upper die, to force the grown edges of the sheet away from the upper die, thus permitting air to enter between the upper die and the sheet, releasing the action of the vacuum and allowing the sheet to drop upon the tray.

If the bottom of the upper die is to be oiled, the deckle should preferably rise to get out of the way of the oiler after the sheet has dropped upon the tray, the track and carriage rising preparatory to retracting and the carriage, in retracting, progressing the lubricator or wiper 220 across the bottom of the upper die, as before.

When the carriage and the sheet are near their outer positions the track may be again depressed, permitting transfer rollers 180 to receive and carry away the sheet.

A desirable feature of the invention includes co-ordinating the deliveries of mush or fiber into the flow boxes with the operation of the gates.

Referring to Figure 6, the supply of mush is kept in continuous circulation by a pump which operates continuously to deliver alternatively into the flow boxes or back to the suction side of the pump according to the stage of operation.

As illustrated, the mush or fiber pump 237 delivers continuously to the inlet of a valve 238, which discharges through the outlet 238' into the flow box by means of the pipe 91 as long as the gates 61 are closed and through a bypass 239 to the suction side of the pump 237 when the gates 61 are open.

It will be seen that an operating arm 240 of the valve 238 is connected through a link 241 to a crank 242 on the rocker shaft 82 that operates the gates, so that the gates cannot be opened without by-passing the delivery of mush or fiber around the flow boxes and sending it back to the suction side of the pump 237.

Thus I maintain a continuous flow of fiber to a point near the flow boxes, and, when necessary to prevent further entry of fiber into the flow boxes, I divert the flow into the bypass, thus avoiding precipitation of the fiber, which would occur if the flow were altogether stopped.

A very important feature of my invention is the series of steps which I use to accomplish the charging of the mold, pressing of the fiber and transferring of the sheet from the mold, as well as the new steps which I introduce at various points to perform new functions and to perform old functions in new ways.

Desirable sequences of operation are indicated diagrammatically in Figures 30 and 31, suitable notations on the drawings relating the lines of the diagrams to the respective operating members of a machine assumed to be carrying out the selected cycles. Various positions of the most important operating members are shown diagrammatically in Figures 16 to 29.

Figures 30 and 31 must be understood as not showing the relative durations of the different stages of the illustrated cycles—being merely illustrations, each subject to considerable variation, of suitable simultaneous relations with respect to position and rest or movement of principal operating members.

Figure 30 assumes somewhat different cycles, according to the manner of air venting, and contemplates removal of the finished sheets by a vacuum box.

Figure 31 corresponds to a modified later portion of the cycle of Figure 30. The later portion of Figure 30 illustrates a cycle in which the finished sheets are picked up and removed by the bottom of a vacuum box and Figure 31 shows a cycle in which the finished sheets are received and removed on the top of a tray.

Figures 30 and 31 carry at their tops markings of the numbers of the diagrammatic Figures 16 and 29 to which the various positions on Figures 30 and 31 correspond.

The cycle that includes moving the die down into the mush before closing the gates, thus venting through the open gates, and stopping the die after air venting to close the gates, is represented in Figure 30 by full line indications of the positions of the principal members and the deviations of the alternative cycle from the full-line cycle are shown by dot-and-dash lines.

In the full-line cycle, air venting takes place through the open gates, the die coming to rest in the mush while the gates are still open, the low stop of the die being usually for the purpose of determining with exactness the filling height of the mush at which the dies may begin to press and at which die position the gates should start and complete their closing movements.

In the dot-and-dash line cycle the gates close while the die is well above the mush, the air between the mush and bottom of the die venting, during descent of the die to the mush, through the grooves or recesses along the deckle.

In practice the cycles shown in Figures 30 and 31 may any of them desirably be effected automatically by means of a suitable cam shaft controlling the different operations of the press, one cycle for each rotation of the shaft, the cycle starting by an operator closing a suitable switch of an operating circuit and ending at the end of the cycle by an automatic opening of the switch.

In view of the fact that the cycle need not be and often will not be controlled by a cam shaft, and that the different modifications of the cycle can all be readily effected by suitably variant manual operation of the various controls of the system, a cam shaft has not been shown.

Diagrammatic Figure 33 shows a hydraulic system, with control valves thereof adapted to carry out alternatively the different illustrated cycles of the invention.

These manual controls include a valve 243 controlling the main rams 41, a valve 244 controlling the retracting rams 46, a valve 245 controlling the gates 61 and a valve 246 controlling the deckle 56.

Each of these valves has a handle or lever 247 that may be pushed in to apply pressure to its ram, pulled out to place the ram under exhaust and placed in mid position to place the ram in neutral.

As previously pointed out, the rams 75 above the gates 61 and the ram 89 opposing the gate-opening ram 85 are under constant pressure, preferably by connection direct to the accumulator. The gate opening ram 85 and the hydraulic stop pistons 110 are controlled by the same fluid valve 245.

The main cylinders are maintained full of fluid from the prefilling tank. When pressure is applied to the retracting rams 46, the pilot cylinder 243' opens the prefilling valve 243² to the main cylinders, as is well known.

In the illustration the retracting rams 46 are under full pressure and the prefilling valve has opened due to the action of the pilot cylinder. The rams controlled by the other valves are all in release, the condition being that for raising the upper die.

Describing first the cycle shown in full line in Figure 30, which is also that of diagrammatic Figures 16 to 29, the principal parts are initially in the position illustrated in Figure 16 with the deckle and upper die raised, after the previous sheet has been withdrawn from the mold.

An operator starts the cycle by lowering the deckle from the position shown in Figure 16 to that shown in Figure 17, the downward movement being represented on Figure 30 by a descending line on the deckle graph between the positions for Figures 16 and 17.

It will also be seen that the gates and the deckles move down together, the gates being closed and the flow boxes optionally full with mush overflowing the weirs as shown in Figure 12. The upper die is still up, and considerable free space, suitable for air venting, exists between the top of the deckle and the upper die.

Between the positions of Figures 17 and 18, the gates are opening while the deckle is down, the water lock closing along the line 248 simultaneously with or a little before the opening of the gates.

During the opening of the gates between the positions of Figures 17 and 18 the mush is charging the mold, flowing out the opening gates for the full length of each end of the mold, so that the two inward streams of mush meet in the middle of the mold, filling the mold to an adjustable definite depth that is dependent upon the adjusted height of the weirs 92.

It will be evident that the charge for the mold is measured in the flow boxes. While not all of the mush leaves the flow boxes in the form which I illustrate, allowance must be made for the quantity remaining in the flow boxes.

During the filling of the mold air vents freely between the deckle top and the upper die, as well as through the inlet gates.

Permissibly the water locks are already closed when the gates begin to open, an early portion of the movement of the shaft 82 releasing the counterweighted rockers 132 to effect water locking before the slotted link connections at 81 to the gates begin to raise the gates.

The downward movement of the upper die from its high position to its low position of rest preferably starts somewhat before the position of Figure 18 and is along the line 249, responsive to the hydraulic pressure applied to the tops of the lower stop pistons 110 which are in pressure connection with the cylinder of the gate opening ram 85.

The hydraulic pressure applied to the stop pistons 110 and to the gate-opening ram 85 cannot rise until both the stop pistons and the gate-opening rams meet material resistance and therefore not until the lost motion in the connections is taken up and the gates begin to lift.

The relatively slow downward movement of the upper die along the line 249 begins substantially at the same time with the relatively rapid lifting of the gates along the line 250, the mush finding its level in the mold while the descending die is still well above the mush.

Between the positions of Figures 18 and 19 the upper die moves downward and finally comes to rest in the mush, having forced out the air above the mush between the upper die and the deckle or through the gates. Downward movement ceases because of the lower stop mechanism, which may alternatively be that of Figure 2 or that of Figures 3 and 4.

The gates close between the positions of Figures 19 and 20. In Figure 20 the upper die is in its lower stop position preliminary to pressing and the gates have been closed.

The closure of the gates is effected by the constant pressure rams 75 when the hydraulic pressure upon the gate-opening ram 85 is released. The final movement of the rocker shaft 82, which may have lost motion operative connections with the gates, may be used to open the water locks by lifting the counterweighted rockers 168 either during final closing of gates or after the gates are closed, this closure being indicated by the line 251, Figure 30.

It will be evident that I prefer to maintain waterlocking as nearly as possible up to the very moment when pressing starts. I regard it as particularly desirable to waterlock while the upper die is moving into contact with the mush, and while the upper die is squeezing out air or excess mush from the mold.

As soon as the gates have fully closed and the water lock has opened, the upper die should start downward as indicated along the line 252, Figure 30, from the position of Figure 20 to that of Figure 21. The full pressure of the main rams is maintained on the upper die along the substantially horizontal line 253, after the water has been largely expelled from the sheet, in order to allow the sheet to come into equilibrium, and to permit escape of entrapped fluid.

Between the positions of Figures 21 and 22, as indicated in Figure 30, the deckle, including the closed gates, lifts as a unit, reaching finally the position shown in Figure 22, and there coming to rest.

During the upward movement of the deckle the sheet is under considerable pressure, since desirably the full pressure of the main cylinders is applied, while the edges of the sheet are unsupported by the deckle. The pressure at this time squeezes the sheet out laterally, causing the sheet to grow slightly beyond the original confines of the mold.

While the lateral growth of the sheet is slight in extent, it is extremely important in its function, since it makes possible automatic and accurately timed separation of the sheet from the upper die by pressure of the grown edge of the sheet against some engaging surface, preferably the bottom of the deckle.

Between the positions of Figures 22 and 23, the upper die and the adhering sheet are raised, and, at some point in the upward travel of the upper die, the grown edges of the sheet engage the deckle, slightly bending the edges of the sheet away from the upper die as exaggerated in Figure 23. The bending down of the edges permits the entrance of air between the upper die and the sheet, so that the sealing vacuum is broken. Furthermore, the deckles mechanically force the sheet away from the upper die.

As soon as the sheet is separated or stripped from the upper die, the sheet drops from the position of Figure 23 to that of Figure 24. In the mode of operation now being described, the sheet falls upon the screen 129. The sheet is relatively fragile at this stage of its manufacture, so that the dropping distance should be very small. This distance is of course exaggerated in Figures 23 and 24.

During the dropping of the sheet, the deckle and closed gates move up as a unit a short distance along the lines 254 and 255 in order to be out of the way of the wiper or oiler mounted upon the transfer mechanism which moves inward to withdraw the sheet from the mold.

Between the positions of Figures 24 and 25, the carriage moves into the mold, and the oiler lubricates the lower surface of the upper die. The motion of the carriage into the mold is completed between the positions of Figures 25 and 26, thus finishing the first wiping and oiling of the lower surface of the upper die. The relative lineal movement of the vacuum box upon the carriage, and the length of the wiping step, are shown on Figure 30.

The track 152 depresses along the line 256 between the position of Figure 26 and that of Figure 27, bringing the suction face of the vacuum box against the top of the sheet (Figure 27). The vacuum is turned on at the line 257 by contact mechanism upon the switch commutator 172.

The track 152 elevates along the line 258 between the positions of Figures 27 and 28, lifting the suction box 177 and with it the sheet, so that the sheet is supported from above free from engagement with the upper surface of the lower die, that is, with the wire.

Withdrawal of the sheet from the mold is completed by movement of the carriage from the position of Figure 28 through that of Figure 29, to the position for beginning the next cycle, Figure 16. During movement of the carriage from the position of Figure 28 to those of Figures 29 and 16, the oiler lubricates the lower surface of the upper die 38 for a second time, as shown on Figure 30.

Between the position of Figure 28 and that of Figure 16, and in the position of Figure 29, the wire 129 is shifted laterally for washing as previously explained.

Figure 29 shows the carriage retracting outwardly, supporting the finished sheet upon the bottom of the vacuum box and simultaneously wiping the bottom of the die as it progresses outwardly.

In the modified cycle, shown in dot-and-dash lines on Figure 30, the deckle and the closed gates move down together between the positions of Figures 16 and 17.

The gates are then opened along the dot-and-dash line 259 between the positions of Figures 17 and 18, the water lock as before closing at the time of opening of the gates to prevent downward seepage of water through the filter bed of the bottom die.

The gates close along the dot-and-dash line 258 between the positions of Figures 18 and 19, and the water lock opens along the dot-and-dash line 260 between the positions of Figures 18 and 19, responsive to the gate closing mechanism.

The downward movement of the upper die takes place along the line 261, the upper die being still well above the upper surface of the mush when the gates are closed.

During the descent of the upper die along the line 261, while the die is still above the mush, the air from between the die and mush begins to escape through the groove or recess vents spaced along the deckle or deckle liners. From the time of engagement between the upper die and mush the cycle may be as already described.

In the alternative cycle for the later portion of Figure 30, represented by Figure 31, where the transfer of the finished sheet is effected on the top of a tray instead of on the bottom of a vacuum box, the cycle may be the same as already described up to the position of Figure 21.

The deckle and closed gates may move all the way up as a unit along the lines 262 and 263. The growing of the sheet takes place between the positions of Figures 21 and 22 as shown in Figure 31, the die being then raised before the inward travel of the carriage.

The 180° inward cycle of the transfer mechanism takes place between the positions of Figures 23 and 27 as shown in Figure 31. After the carriage comes to rest at its inward position, the upper die moves up at the line 264, stripping the sheet from the bottom of the upper die at 265 by pressure against the deckle, the sheet dropping upon the tray.

During retractive movement of the carriage the bottom of the die may or may not be oiled or wiped depending upon operating conditions, the diagram of Figure 30 indicating that there is no wiping upon the retraction of the carriage.

Excess initial filling of the mold offers many advantages, useful with an open mold filling, but best with closed mold and open gate filling. The mold is filled with deliberate excess preferably, but not necessarily measured, and the additional quantity is pressed back by approach of the dies until the mold contains the intended quantity to be pressed. If the gates be open to a height above the mush level, venting takes place through the gates, otherwise through vents preferably between the deckle and upper die. In either event the excess mush is squeezed out through the fully or partly open gates. The excess filling has desirable features even where it fills against a partly lowered upper die in an otherwise open or closed mold.

Overfilling is particularly advantageous because mush can be flowed in readily and quickly without waiting to eliminate the last entrapped air, and with or without waiting for settlement until the top of the mush is entirely level. Furthermore, the expelling of the excess mush may be used to carry out any remaining entrapped air. As it is certain that all of the mold is filled with mush at the time pressing commences, rather than partly with mush and partly with air, great accuracy of filling can be secured.

It will be evident of course that my step of excess filling and expelling the excess may be used in any suitable cycle, but is particularly desirable in my cycle as disclosed in Figures 16 to 29.

Very obviously, my various steps and cycles may be carried out in wet machines of different types. While I prefer to use a machine having a stationary lower die and a movable upper die, as shown in most of the figures, I may employ a machine having a stationary upper die 38' and a movable lower die 36' as shown in Figure 34, or having movable upper and lower dies $38^2$ and $36^2$, as shown in Figure 35.

Where the lower die is the movable die for press purposes the wire screen and its operating mechanism should be supported along with the lower die and should move upwardly with it. This is contemplated in the structure of Figure 35 as are also intended such changes of deckle relation with the upper die as are desirable in view of the changed condition of motion. The deckle movement with respect to the upper die is still of course desirable for the purpose of freeing the mold space between the dies for removal of the sheet and further to permit advantage to be taken of the growth of the sheet after the deckle has been raised out of the way and the subsequent separation of the sheet from the upper die by relative movement of the deckle and upper die which will then be downward movement of the deckle. The lower die can be stopped in any position desired to determine the extent of drop of the sheet after its release and can subsequently be moved further to the position of transfer of the sheet, if that be different and/or to the final open position of the mold.

Where the removal of the sheet is to be effected by a suction carrier, movement of the lower die can be used to cause engagement of the sheet with the suction surface of the carrier, avoiding need for carrier supporting means to lower the position of the carrier for this purpose. The same advantages of movement of the lower die to secure suction engagement with the sheet is available in the form of Figure 36 where the lower die, which need not be the pressing die, is movable and where its movement can be used for this purpose.

In both of the forms of Figures 35 and 36 the lower die is dropped, of course, after lifting movement to secure vacuum engagement between the sheet and carrier in order that the carrier may move the sheet freely from between the dies of the press.

With both of the forms of Figures 35 and 36 the capability of using the lower die to secure sheet and carrier suction engagement does not make it necessary that the dies be so used as these devices are fully operative with other means of securing this engagement and in individual cases it may prove better to use some other means than to interrupt the operation of the die for such a purpose.

It will be evident that my mechanism and method contemplate various alternative desirable modes of operation and in particular that parts of my invention are valuable, some with open molds (open at the top during filling) and some with closed molds.

With one contemplated method of operation the mold is completely open at the time of filling and the mush is filled in to its desired height equal to the ultimate intended height or above it according to the subsequent steps which are to be applied.

With this open mold the two dies may approach each other until the mold is closed, giving free egress to air through the open mold or through suitable gates or vents. If through the open mold the further movement of the movable die may be used to vent the additional air through grooves or passages in the side of the deckle. With this use the initial movable die operation would preferably be by gravity and the final movement by partial pressure.

Where the venting is through the gates or suitable vents other than the open top, the gravity movement would ordinarily be used for the entire movable die operation to the point where the gravity movement stops against the mush. This is subject to the qualification that where the mold is over-filled the die may be stopped at a spacing between the respective dies corresponding to the intended depth of mush which is to be pressed.

Thus with either open or closed molds, advantage may be taken of over-filling and pressing out of the excess through the inlet or inlets. This part of my invention is therefore independent of the type of mold, whether open or closed, and can be used with any type of mold but with greatest advantage where gates are left open for expression of the air above the filling level before the expression of the over-charge of filling material begins.

In all of my forms the best results are obtained with flow boxes at both ends, so as to divide the flow and so that where the air is driven out through the filling gates the air may flow out equally at both ends and the filling material (if there be an over-charge) may also be expressed freely at both ends. This is true notwithstanding that all of the forms of my invention are operative to considerable advantage with a single flow box only.

The different adjustments of weir height, "close" or "approach" die stop and "spaced" die stop are independently of value but reach their highest development where they are interconnected or otherwise coordinated.

The weir adjustment makes available a very exact form of gauging within the flow box (and for this reason in closest proximity to the mold) the amount of mush required for any predetermined filling, avoiding danger of settling between this point of gauging and actual use and avoiding necessity for and therefore injury from excessive heads which might otherwise be used if the gauging were not applied. The excessive heads are objectionable because of the uneven distribution of the fibrous suspended material within the mold when there has been excessive velocity of inlet flow.

The "approach" stop adjustment of the dies makes it possible to directly and exactly determine the spacing between the dies if filling is to be effected within a closed mold against the upper die, whether excess filling or filling to the depth to be pressed only, as well as to exactly determine the depth of filling below the level of the upper die whether excess filling or filling the depth to be pressed only. It also exactly sets the approach of the dies after squeezing out excess filling and gives a control of press operation which cannot otherwise be secured. The approach stop can be used either for a limit of depth of filling to be pressed or a limit of excess filling.

The weir adjustment and close approach die stop within the mold are both helpful for the same purpose of limiting the amount of mush which is handled closely to the amount that is needed for the character (method) of press operation which is intended and cooperate together nicely to utilize all or a predetermined very large percentage of all of the mush capacity of the flow box.

The venting from both ends cooperates with the filling from both ends and both assist in minimizing the variation of the thickness of the sheet.

Moreover, assuming that the center of the mold receives less filling than the portions adjoining the two in-flow ends the pressing out of excess mush takes place largely at the ends and therefore greatly helps to equalize the volume per unit length of the filling. Since the upper die engages the higher (end) portions of the filling first and progressively spreads in engagement toward the middle, pressing none from the middle until the ends have been pressed down to a depth of filling corresponding to the initial filling at the middle, the pressing out of excess filling affords an ideal means of equalizing the filling throughout the mold.

The adjustment of the upper stop is quite desirable but not essential. It may be used not only for its own value but also for the purpose of conveniently adjusting the lower stop when both are carried together. The purpose of adjusting the upper stop is to limit the separating movement of the dies to an amount sufficient for the purpose without waste and to maintain the same effective opening die movement with variant die fillings, thus securing economy of time of die movement not otherwise attainable. It also cooperates with maintenance of an effective cycle of operation in which the relation of openings of the die above the charge surface may be maintained throughout wide variations in filling depth. In other words the surplus separation of the die above the filling level may be made the same for all filling depths.

The interrelation of the adjustments between the lower die and the weir is particularly desirable because it secures additional flow-box filling storage supply in exact agreement with the need for any new filling depth and the proper position of the approach stop for expressing a reliable amount of over-supply or for die engagement with predetermined proper depth of filling.

Except as the separation stop is used as a basis for adjustment of the approach stop it will be seen that cooperation between the approach stop and the weir adjustment is of greater importance than cooperation between the spacing or separation stop and the weir adjustment.

With different detail of construction used it is, of course, desirable to operate the movable die as far as possible by gravity or at low pressure so as not to disturb the relation of the fibers in the mush, to have them lie as naturally in position as possible, merely closing the spaces between them, by eliminating the water with as little movement as possible. This also saves accumulator power and uses the heavy pressure of the main hydraulic cylinders for as short a stroke as possible. The additional water for the main cylinders is secured from a suitable prefilling system.

It has been my purpose in illustrating different forms of apparatus and different permissible sequences and methods of operation to give breadth to the language used in the claims.

One example of this appears in the indication that either the upper die or lower die may be movable. Another appears in the suggestion that the stops need not be of the same type and need not follow the same law of operation. It has not been considered necessary to show more than two types of stop, mechanical and hydraulic, nor more than two types or methods of operation of the lower stop, namely by limiting movement by a block in the mechanical form and by pressing the movable die to a determinate limit against push backs or pull backs in the hydraulic form.

The several variations in the filling and in the die movement for closing the die against the mush, with or without expressing part of an overfilling, have also been intended to give breadth to the language used. So also are the statements in the specification that certain features of invention are independent of the character of the press from the standpoint there shown, or are not dependent upon the type of mechanism or method of operation disclosed. Doubtless many other illustrations of the breadth of the invention will be apparent to those skilled in the art, which have been so clear and evident that they have not been separately discussed.

The removal of the sheet from between the dies can be effected by either type of mechanism illustrated, using wholly distinct mechanism, either to operate as a suction-supporting carrier of a sheet which has already dropped to the lower die before insertion of the carrier, or a tray whose upper surface receives the sheet, or—as illustrated— a single mechanism capable of performing both functions.

With the suction carrier it has been the intention to indicate that many different means and methods of securing suction contact with the sheet can be used, and to illustrate by several different methods of means among many, such as the depression of the track and the movement of the lower die.

These are the simpler ways and in particular involve less expense and complication than would be required if the carrier-lowering mechanism must itself be supported by and moved with the carrier but the carrier means would of course be fully operative.

Whether the carrier system be used or the tray system, the distance which the sheet drops to the lower die or to the top of the tray, respectively, is fully within the control of the designer who can cast off the sheet at any level desired by merely lifting the upper die to that level—the height best suited for his design—and then the deckle or other stripper, separately supported and moved or supported and moved by the deckle, can be set at the height at which it is to strip the sheet from the upper die and the upper die can be lifted to a level higher than the bottom edge of the deckle or stripper to cause the stripping. Both with the carrier and with the tray, therefore, the distance through which the sheet is dropped can not only be predetermined very exactly, but it can be altered by alteration of upper die or deckle or stripper position at which their final relative movement takes place.

It will be evident that the discussion above as to free choice of use of carrier or tray and control of the height through which the sheet is to be dropped as well as the question of whether die or deckle or stripper movement shall cause this dropping applies to presses having deckle movement and not to presses having upper die movement alone.

Wiping and oiling can of course be independently performed and the oiling need not be done by brush or other contact means. Though I have shown brush (contact) means of oiling this is shown because of application of my press to flat sheets in the illustrations and not because for other sheets, for example, I consider brush oiling superior to spray oiling.

With corrugated or relieved, or embossed board, spray oiling has many advantages and can easily be effected by the simple expedient of locating spray nozzles at the end of the carrier or tray at a suitable distance below the upper die face and connecting these nozzles with a source of oil under pressure always outside of the mold space.

Though I prefer overfilling of the surplus charge of mush for the reasons already pointed out, I recognize that many features of my invention are quite desirable in connection with normal filling to the height of intended charge at which pressing begins. This is facilitated also, where desired by my weir control of the capacity of mush between the weir level and the level at which the mush comes to rest when the gate or gates is or are open.

Moreover the filling to this intended level at which pressing is to begin can be effected before the upper die comes down, venting initially through the open mold and then through grooves in the deckle or deckle lining, or venting through the gates, or can be applied to a closed mold venting through the gates; and whether the upper die be down at this position as a second limit of level or not. Where the upper die is down initially to the point at which pressing is intended to begin, venting at both ends through the filling gates is a very considerable improvement over venting at one end only and the use of the weir to control the height of filling to the height at which the upper die is set avoids such an overfilling within the flow boxes as would interfere with proper venting through the gates.

The by-passing permits such constant movement of the fibers in suspension as to prevent any separation of the fibers and liquid and provides a uniformity of mixture advantageous with all of the forms and with all of the methods of operation included herein. This uniformity of mixture at the flow box is furthermore protected by the weir control of the capacity of the box, limiting its content to a reasonable amount required for the intended operation and avoiding excessive heights and consequently excessive speeds of flow into the mold.

Though I have referred to "fibers" and to fibers suspended in a liquid this language has been selected because of the substantially universal presence of fiber of one kind or another, vegetable, mineral or animal, in the compositions which would ordinarily be handled in a wet press and not because there was any thought that the mush to be handled will necessarily contain fiber alone; since along with the fiber such as wood pulp, bagasse, corn stock, straw or other vegetable character, or asbestos, mineral wool, or other mineral fiber, leather hair or other animal fibers, nonfibrous solid or liquid or gelatinous material may be used. This will be better understood by reference to the very common use of cement, magnesia, lime, sodium silicate and other minerals in compositions for fireproofing and to give body, held together by a fiber content; arsenates, sodium fluoride, etc., used with or without fibers for insecticides and chemicals of various characters for bonding and filling purposes.

My invention is applicable to any of these which can be resonably flowed and filter pressed and my language in the claims is intended to simplify by the reference to one general ingredient without intending to exclude other ingredients which may also be present. The water ordinarily used has for convenience been treated as the medium of suspension though it is recognized that oil and many acids and alkalis whose value is desired for other purposes would serve also as the medium.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. The method of operation of a wet mold press having a movable upper die and a deckle about it which consists in lifting the upper die above the deckle, in filling the mold through the deckle while the air vents freely above the deckle, in lowering the upper die into contact with the charge while venting laterally between the upper die and deckle to utilize the movement of the upper die to facilitate the venting and in pressing the charge.

2. The method of preparing a sheet from finely divided fiber suspended in a liquid within a mold having relatively movable upper and lower dies, the lower die including a movable wire, which consists in charging the mold with fiber, in moving one of the dies toward the other to press liquid from the fiber and to change the fiber into a sheet, in moving one of the dies from the other, in transferring the sheet from the mold free from engagement with the wire and in concurrently moving the wire from the mold and cleaning the wire.

3. The method of operating a wet machine to prepare a sheet from finely divided fiber suspended in a liquid within a mold having relatively movable upper and lower dies, the lower die including a movable wire, which consists in charging the mold with fiber, in moving one of the dies toward the other to press liquid from the fiber and to change the fiber into a sheet, in moving one of the dies away from the other, in separating the sheet from the upper die, in supporting the sheet from above, in transferring the sheet from the mold and in concurrently withdrawing the wire from the mold and cleaning it.

4. The method of preparing a sheet from finely divided fiber suspended in a liquid within a mold having relatively movable upper and lower dies, the lower die including a movable wire, which consists in charging the mold with fiber, in moving one of the dies toward the other to press liquid from the fiber and change the fiber into a sheet, in moving one of the dies away from the other, in separating the sheet from the upper die, in catching the sheet above the wire, in transferring the sheet from the mold free from engagement with the wire and in concurrently withdrawing the wire from the mold for cleaning.

5. The method of preparing a sheet from finely divided fiber suspended in a liquid within a mold having relatively movable upper and lower dies and a flow box which consists in using the flow box capacity above any residuum as a measure for a definite quantity to be charged, in varying the capacity of the flow box to suit the desired thickness of the sheet in charging the measured quantity into the mold and in moving the dies relatively closer together to press the charge.

6. The method of operating a wet mold press having a movable upper die and a deckle, which consists in lifting the upper die above the deckle, in filling the mold through the deckle with a measured charge while the air vents freely above the deckle, in lowering the upper die into contact with the charge while venting laterally between the upper die and deckle, using the movement of the upper die to facilitate the further venting, and in pressing the charge.

7. The method of preparing a sheet from finely divided fiber suspended in a liquid within a mold of a wet machine having an adjacent communicating flow box, which consists in filling the flow box to overflowing, in varying the overflow level of the flow box to suit the desired thickness of the sheet, in charging from the flow box into the mold the measured quantity of charge below the overflow level and above any residuum of the flow box and in pressing the fiber.

8. The method of preparing a sheet from finely divided fiber suspended in a liquid within a mold of a wet machine having an adjacent communicating flow box, which consists in filling the flow box to overflowing, in charging from the flow box into the mold a measured quantity of fiber below the overflow level of the flow box and down to the common level of fiber in the flow box and mold and in pressing the fiber.

9. In the operation of a wet machine having a mold provided with relatively movable upper and lower dies, the art which consists in filling the mold at the side with an externally measured quantity of finely divided fiber suspended in a liquid, having a volume less than the volume of the mold at the time of filling.

10. In the operation of a wet machine having a mold provided with relatively movable upper and lower dies, the method which consists in charging the mold with a quantity of finely divided fiber suspended in a liquid having a volume less than the volume of the mold at the time of charging, while concurrently air venting the mold, in moving the dies relatively closer together while concurrently air venting the mold until the upper die is in contact with the charge, in decreasing the rate of relative movement of the dies, in closing the mold and in pressing the fiber.

11. In the method of claim 10, the art which consists in stopping relative movement of the dies when the upper die is in contact with the charge until the mold is closed.

12. In the method of claim 10, the art which consists in determining the quantity of fiber before charging, in varying the measurement to suit the thickness of sheet desired, in varying the position of decrease in the rate of relative movement of the dies responsive to variation in the quantity of charge and in varying the maximum separation of the mold top and bottom responsive to variation in the quantity of charge.

13. In the method of claim 10, the art which consists in charging the mold at the side and in air venting the mold above the place of charging.

14. In the operation of a wet machine having a mold provided with a relatively movable top and bottom and a deckle, the art which consists in charging the mold through the deckle with a volume of charge less than the mold volume at the time of charging and in concurrently air venting the mold at the place of charging.

15. The method of operating a wet machine having a mold and a measuring flow box, which consists in continuously supplying moving finely divided fiber suspended in a liquid, in intermittently filling the flow box from the supply, and in charging the mold from the flow box between intervals of filling.

16. In the method of claim 15, the art which consists in overflowing excess flow to secure a desired level in the flow box.

17. In a method of claim 15, the art which consists in charging the mold from the hopper and in concurrently by-passing the supply around the hopper.

18. In the method of claim 15, the art which consists in overflowing the excess supplied, in charging the mold from the hopper and in concurrently by-passing the supply around the hopper.

19. The step in the operation of a wet machine having a hopper, which consists in continuously supplying finely divided fiber suspended in a liquid unidirectionally to a point close to the hopper at all times during the operation of the machine.

20. The method of preparing a sheet from finely divided fiber suspended in a liquid within a mold having a relatively movable top and bottom, which consists in filling the entire mold with fiber to a depth greater than that required to produce a sheet, in expelling the excess of fiber from the mold, in closing the mold and in pressing the remaining fiber into a sheet.

21. In the method of claim 20, the art which consists in expelling the excess of fiber from the mold by moving the mold top and bottom relatively closer together.

22. In the method of claim 20, the art which consists in expelling the entrapped air and in subsequently expelling the excess of fiber from the mold.

23. In the method of claim 20, the art which consists in filling the mold while venting the mold at the top of the filling opening.

24. In the method of claim 20, the art which consists in filling the mold at the side and expressing excess charge at the point of filling.

25. In the method of claim 20, the art which consists in filling the mold at opposite sides while venting the mold and in expressing excess charge at the points of filling.

26. In a wet machine for making sheets or boards from suspended finely divided fiber, relatively movable upper and lower dies, a deckle about the movable die and movable with respect to it, a carrier normally supported outside of the space between the dies and adapted to move into the said space and from it, a screen adapted to engage the lower die and to receive the fibrous material, means for reciprocating the screen in opposite directions and cleaning means for the screen at each end of its movement, operative during movement of the screen, whereby one section of the screen can be used while the other is being cleaned and the cleaned section can be used while the other is being cleaned.

27. In a wet machine for making sheets or boards from suspended finely divided fiber, relatively movable upper and lower dies, a deckle about the movable die and movable with respect to it, a carrier normally supported outside of the space between the dies and adapted to move into the said space and from it, a reciprocable screen, movable in opposite directions to points beyond the lower die to an extent in each direction equal to more than one-half the corresponding dimension of the lower die and cleaning spray mechanisms for engaging the screen during its movement and located one at each end of the die in the direction of screen movement whereby the screen can be reciprocated in opposite directions and cleaned during each reciprocation.

28. In a wet machine for making sheets or boards from suspended finely divided fiber, relatively movable upper and lower dies, a deckle about the movable die and movable with respect to it, a carrier normally supported outside of the space between the dies and adapted to move into the said space and from it, a longitudinally shiftable screen between the dies, a pair of drums upon and from which the ends of the screen are wound, a motor operating one of the drums and a resilient take-up for the other drum tending to wind the screen upon it, whereby the motor may be operated to wind or unwind the screen upon its drum against the resilient winding mechanism of the other drum.

29. In a wet machine for making sheets or boards from suspended finely divided fiber, relatively movable upper and lower dies, a deckle about the movable die and movable with respect to it, a carrier normally supported outside of the space between the dies and adapted to move into the said space and from it, a screen reciprocable between the dies, a pair of drums upon and from which the ends of the screen are wound, a motor operating one of the drums, a resilient take-up for the other drum tending to wind the screen upon it, and cleaning mechanism located on opposite sides of the lower die for cleaning the screen, whereby the motor may be operated to wind upon its drum against the resilient winding mechanism of the other drum and reverse of the motor permits the other drum to wind the screen.

30. In a wet machine, upper and lower relatively movable dies, a deckle, a flow box adjacent to the deckle, a gate controlling flow through the deckle and a continuous source of finely divided fibrous material in motion in filling proximity to the flow box.

31. In a wet machine, upper and lower relatively movable dies, a deckle, a flow box adjacent to the deckle, a gate controlling flow through the deckle, a continuous flow of finely divided material in filling proximity to the flow box and a weir in the flow box determining the limit of height of filling of the flow box.

32. In a wet machine, upper and lower relatively movable dies, a deckle, a flow box adjacent to the deckle, a gate controlling flow through the deckle, a continuous flow of finely divided material in filling proximity to the flow box, a weir in the flow box determining the limit of height of filling of the flow box and means for varying the height of the weir.

33. In a wet machine, upper and lower relatively movable dies, a deckle, a flow box adjacent to the deckle, a gate controlling flow through the deckle, a continuous supply of finely divided suspended fibrous material in motion in filling proximity to the flow box, a valve for filling the flow box from the supply and a by-pass for the supply when the flow box in not being filled.

34. In a wet machine, upper and lower relatively movable dies, a deckle, a flow box adjacent to the deckle, a gate controlling flow through the deckle, means for continuously supplying finely divided fibrous material suspended in a liquid and alternative means for turning this supply into the flow box and for by-passing it.

35. In a wet machine, upper and lower relatively movable dies, a deckle, a flow box adjacent to the deckle, a gate controlling flow through the deckle, means for continuously supplying finely divided fibrous material suspended in a liquid, alternative means for turning this supply into the flow box and for by-passing it, and a weir in the flow box determining the limit of height of level in the flow box.

36. In a wet machine, upper and lower relatively movable dies, a deckle, a flow box adjacent to the deckle, a gate controlling flow through the deckle, means for continuously supplying finely divided fibrous material suspended in a liquid, alternative means for turning this supply into the flow box and for by-passing it, a weir in the flow box determining the limit of height of level in the flow box and means operated by the gate for shifting from flow into the flow box to flow through the by-pass.

37. In a wet machine, upper and lower relatively movable dies, a deckle, a flow box adjacent to the deckle, a gate controlling flow through the deckle, means for continuously supplying finely divided fibrous material suspended in a liquid, and connections between the gate and the supply to by-pass the supply from the flow box when the gate is lifted.

38. In a wet machine, upper and lower relatively movable dies, a deckle, a flow box adjacent to the deckle, a gate controlling flow through the deckle, means for continuously supplying finely divided fibrous material suspended in a liquid, a by-pass for the supply, connection from the supply with the flow box and common means for lifting the gate and turning the flow of the supply from the flow box into the by-pass.

39. In a wet machine, upper and lower relatively movable dies, a deckle for one of the dies, a wire on the lower die and adapted to move out from the lower die, means for moving the wire, means for concurrently cleaning the wire as it moves and means for supporting the sheet above the wire and transferring the sheet from the mold concurrently with the movement of the wire.

40. In a wet machine, upper and lower relatively movable dies, a deckle for one of the dies, a wire upon the lower die, means for lifting the sheet from the wire and moving it bodily from the space between the dies while so lifted and separate means for moving the wire and for cleaning it.

41. In a wet machine, upper and lower relatively movable dies, a deckle for one of the dies, a wire upon the lower die, means for lifting the sheet from the wire and moving it bodily from the space between the dies while so lifted and separate means for moving the wire while the sheet is separated from the wire and for cleaning it.

42. In a wet machine, upper and lower relatively movable dies and a deckle for one of the dies, there being grooves in the deckle to permit air release through the grooves as the dies move relatively to each other and before pressing.

43. In a wet machine, an upper movable die and lower fixed die, a deckle cooperating with the upper die, there being grooves in the deckle to permit air release through the grooves as the dies move relatively to each other and before pressing and the grooves extending downward to approximately the lowest filling level.

44. In a wet machine, upper and lower relatively movable dies, a deckle cooperating with the dies and walls forming drainage channels through the deckle to drain water accumulated above the upper die during movement of the movable die.

45. In a wet machine, upper and lower relatively movable dies and a deckle cooperating with the dies, the upper part of the deckle being relieved to permit the deckle to hold a relatively high charge but for lower charges to permit air venting through the relief of the deckle.

46. In a wet machine having upper and lower relatively movable dies, a deckle cooperating with the dies and a gate in the deckle, means for lifting and lowering the gate, a flow box connected with the deckle, a weir in the flow box providing a limit of filling height for the flow box to include a quantity in excess of that required to charge the mold for the thickness of sheet intended and means for moving one of the dies toward the other while the gate is open to a rest position at a definite spacing from the other die equal to the depth of filling required, in order to expel the surplus filling.

47. In a wet machine, upper and lower dies spaced at the time of filling in excess of the depth of intended filling for the sheet to be produced, and movable one toward the other, a deckle for one of the dies, a gate in the deckle, a flow box communicating with the mold through the gate, an adjustable weir for the flow box for lifting and lowering the level, mechanism for the adjustable weir whereby it may be set to deliver a charge to the mold in excess of the intended charge and means effective through the movement of one of the dies for expelling part of the charge through the gate until the charge is of the intended depth.

48. In a wet machine, upper and lower dies spaced at the time of filling in excess of the depth of intended filling for the sheet to be produced and movable one toward the other, a deckle for one of the dies, a gate in the deckle, a flow box communicating with the mold through the gate, an adjustable weir for the flow box for lifting and lowering its fluid level, mechanism for the adjustable weir whereby it may be set to deliver a charge to the mold in excess of the intended charge and means effective through the movement of one of the dies for expelling part of the charge through the gate until the charge is of the intended depth, the means being operative while the gate is open above the height of the charge to permit exit of air through the gate.

49. In a wet machine, upper and lower dies movable relatively to each other and when open spaced at the time of filling in excess of the depth of intended charge, a filling supply therefor adapted to fill the mold in excess of the intended depth of charge, a gate for control of the filling and of discharge and die-operating means for moving one of the dies toward the other to a spacing equal to the depth of intended charge operative while the gate is open.

50. In a wet machine, upper and lower dies movable relatively to each other and when open spaced at the time of filling in excess of the depth of intended charge, a filling supply therefor adapted to fill the mold in excess of the intended depth of charge, a gate for control of the filling and of discharge, die-operating means for moving one of the dies toward the other to a spacing equal to the depth of intended charge operative while the gate is open and a stop for holding the movable die in its intermediate position until the gate is closed.

51. In a wet machine, upper and lower dies movable relatively to each other and when open spaced at the time of filling in excess of the depth of intended charge, a filling supply therefor adapted to fill the mold in excess of the intended depth of charge, a gate for control of the filling and of discharge and die-operating means for moving one of the dies toward the other to a spacing equal to the depth of intended charge, operative while the gate is open to a distance greater than the depth of fiber beneath the gate.

52. In a wet machine, upper and lower relatively movable dies, a deckle for one of the dies, a gate in the deckle, lifting and lowering mechanism for the gate, a stop controlling the ultimate limit to separating movement of the movable die, connections normally limiting the closer approach of the movable die to the fixed die, operated by the first stop and intercommunicating connections between the stop control mechanism of the dies and the operating mechanism for the gate for holding the movable die at the closer stop spacing until closing movement of the gate.

53. In a wet machine, upper and lower relatively movable dies, a deckle for one of the dies, a stop limiting outward movement of one of the dies, a stop limiting inward movement of the same die, interconnection between the stops, a gate, means for raising and lowering the gate and a control for movement beyond the lower stop interconnected with the operation of the gate to permit movement after the gate has been closed.

54. In a wet machine, upper and lower relatively movable dies, a deckle for one of the dies, an adjustable stop adapted to hold the movable die spaced from the fixed die at a spacing corresponding to the desired filling for the intended sheet and connections varying the supply for the mold with adjustment of the stop.

55. In a wet machine, upper and lower relatively movable dies, a deckle for one of the dies and a stop limiting the separation of the dies for filling at a distance greater than the intended depth of charge to be pressed.

56. In a wet machine for making sheets or boards from suspended finely divided fiber, relatively movable upper and lower dies, a deckle about the movable die and movable with respect to it, a gate, means for raising and lowering the gate, a stop, a stop adjustment, a release for the stop interconnected with the gate and operated when the gate is wholly closed, a flow box, means for supplying material for a charge to the flow box and a weir limiting the height of charge within the flow box and means for raising and lowering the weir interconnected with the adjusting means for the lower stop.

57. In a wet machine, upper and lower relatively movable dies, a deckle for one of the dies, a flow box, a weir in the flow box, a gate in the flow box, means for raising and lowering the gate, means for adjusting the weir, a stop initally limiting approach of the movable die toward the fixed die, an adjustment for the stop and common means for adjusting the height of the weir and the position of the stop for initial approach of the dies.

58. In a wet machine, upper and lower relatively movable dies, a deckle cooperating with the dies, a flow box, a weir in the flow box, a gate controlling filling from the flow box, means for raising and lowering the gate, means for raising and lowering the weir, a stop initially limiting approach of the movable die toward the fixed die, an adjustment for the stop and common means for adjusting the height of the weir and the height of the stop for initial approach of the dies, so proportioned and timed as to provide filling of the charge in the mold in excess of the ultimate intended charge and expulsion of the charge by the movable die while the gate is open and subsequent gate closure.

59. In a wet machine, upper and lower relatively movable dies and a deckle cooperating with the dies, forming a mold, a flow box, a gate between the flow box and the mold, means for raising and lowering the gate, and a stop for initial approach of the two dies released by operation of the closing means for the gate.

60. In a wet machine, upper and lower relatively movable dies, a deckle cooperating with the dies, forming a mold, a flow box, a gate between the flow box and the mold, means for raising and lowering the gate, operating mechanism for the movable die, an interconnection between the gate and the operating mechanism for the movable die whereby the movable die starts to approach the fixed die when the gate is open and a stop interrupting movement of the movable die until after the gate has been closed.

61. In a wet machine, upper and lower relatively movable dies and a deckle for one of the dies, forming a mold, a flow box, a gate between the flow box and the mold, means for raising and lowering the gate, a source of material to be pressed, means for charging the mold with the material in excess of the intended ultimate depth of charge, movable die means for squeezing back into the flow box the excess of charge and means for closing the gate while the excess charge is so held back.

62. In a wet machine, upper and lower relatively movable dies and a deckle for one of the dies, forming a mold, a flow box, a gate between the flow box and the mold, means for raising and lowering the gate, upper and lower interconnected stops limiting movement of the movable die and means for releasing one of these stops to allow pressing of the sheet, said means being interdependent upon closure of the gate.

63. In a wet machine, an upper movable die and a lower fixed die and a deckle about the movable die, forming a mold, a flow box, a gate between the flow box and the mold, means for raising and lowering the gate, an upper stop limiting upward movement of the upper die to a spacing from the lower die in excess of the intended initial filling, charging means for filling the material to be pressed into the mold in excess of the intended ultimate charge and means for moving the upper die down to a position corresponding to the intended charge, operative while the gate is open to expel excess charge from the mold and subsequently for pressing the upper die down the rest of the way to press the charge.

64. In a wet machine, an upper movable die, a lower fixed die and a deckle about the movable die to form a mold, a flow box, a gate between the flow box and the mold, means for raising and lowering the gate, an upper stop limiting upward movement of the upper die to a spacing from the lower die in excess of the intended initial filling, charging means for filling into the flow box the material to be pressed, in quantity to charge the mold in excess of the intended ultimate charge, means for moving the upper die down to a position corresponding to the intended charge, operative while the gate is open to expel excess charge from the mold, a stop for the upper die to hold it at the level of the intended charge and a release for the stop providing for additional movement of the upper die to press the charge.

65. In a wet machine, an upper movable die, a lower fixed die, a deckle about the upper die, a flow box, a weir in the flow box, a gate between the flow box and the mold, means for raising and lowering the gate, upper and lower stops limiting movement of the upper die, an adjustment of the weir height and an interconnection between the stops and the weir height whereby the weir height is altered with a change of adjustment of the stops to vary the quantity of charge flowing from the flow box to the mold with the variant positions of the stops.

66. In a wet machine, an upper movable die, a lower fixed die and a deckle for the upper die, forming a mold, a flow box, a gate between the flow box and the mold, means for raising and lowering the gate, an upper stop limiting upward movement of the upper die, means for limiting initial downward movement of the upper die to a predetermined distance from the upper die limit and an interconnection between the lower initial die limiting position and the adjusted position of the weir whereby a constant relation is maintained between the upper level of the charge in the mold and the initial lower limiting position of the movable die.

67. In a wet press, an upper movable die, a lower fixed die, a deckle for the upper die, hydraulic retracting means for the upper die, hydraulic pressing means for the upper die, hydraulically operated downwardly pressing means for initially moving the upper die to predetermined downward stroke, a gate normally tending to close, hydraulic means for opening the gate, a flow box providing charge to pass through the gate and hydraulic connection between the gate opening means and the initial downwardly moving means for the upper die.

68. In a wet machine, an upper movable die, a lower fixed die, a deckle, a gate in the deckle, means for opening and for closing the gate, an upper stop for movement of the upper die, a lower stop for movement of the upper die, interrelated with the upper stop, a release for the lower stop and interconnections between the gate, operating means and the release whereby the release is operated after the gate has been closed.

69. In a wet machine, an upper movable die, a lower fixed die, a deckle, a gate in the deckle, means for opening and for closing the gate, a lower stop for movement of the upper die, a release for the stop and interconnections between the gate operating means and the release whereby the release is operated after the gate has been closed.

70. In operating a wet machine including upper and lower relatively movable dies, a deckle having a gate and a flow box communicating with the mold through an opening controlled by the gate, starting with dies separated and the box charged, the method which consists in sequentially opening the gate, vertically moving one die a step toward the other until the upper die is at a definite spacing from the lower die and in engagement with the charge between the dies, in closing the gate and in compressing the charge between the dies.

71. In a wet machine, a top die, a bottom die, a deckle, a longitudinally shiftable screen having an intermediate portion on the bottom die, a carrier adapted to withdraw a finished sheet from between the separated dies, a control shaft, an electric motor operatively connected to the control shaft, operative connections between the shaft and the carrier, a second electric motor, shift mechanism for the screen and operative connections between the shift mechanism and the second motor in combination with a circuit for the first motor including a cut-out switch operatively connected to the control shaft in synchronism with the arrival of the carrier at its inward and outward positions and a throw-in switch operatively connected to the control shaft to close in synchronism with the retraction of the carrier and a cut-out switch operatively connected to the shift mechanism to operate when the screen reaches shift position.

72. In a wet machine, a top die, a bottom die, a deckle, a longitudinally shiftable screen having an intermediate portion on the bottom die, a carrier adapted to withdraw a finished sheet from between the separated dies, a control shaft, an electric motor operatively connected to the control shaft, operative connections between the shaft and the carrier, a second electric motor, shift mechanism for the screen and operative connections between the shift mechanism and the second motor in combination with a circuit for the first motor including a cut-out switch operatively connected to the control shaft in synchronism with the arrival of the carrier at its inward and outward positions and a throw-in switch, and a circuit for the second motor adapting the second motor to operate alternately in reverse directions and including a throw-in switch operatively connected to the control shaft, closing during the retractions of the carrier to operate the motor in one direction during the removal of one sheet and in the reverse direction during the removal of the succeeding sheet and adjustably spaced cut-out switches, operated alternately by the shift mechanism as the screen comes to shift position.

73. The method of filling the mold to uniform mush depth, which consists in filling the mold from both ends relatively to excessive depth at the ends and thinner at the middle and in pressing out the excess filling to a thickness equal to or less than the initial filling at the middle.

HENRI P. L. LAUSSUCQ.